(12) United States Patent
Melick et al.

(10) Patent No.: US 7,376,191 B2
(45) Date of Patent: *May 20, 2008

(54) HIGH BANDWIDTH DATA TRANSPORT SYSTEM

(75) Inventors: Bruce D. Melick, Cedar Rapids, IA (US); David M. Snyder, Cedar Rapids, IA (US); Leslie D. Baych, Cedar Rapids, IA (US); Gregory P. Probst, Iowa City, IA (US); Philip T. Kennedy, Cedar Rapids, IA (US)

(73) Assignee: Lightwaves Systems, Inc., Cedar Rapids, IA (US)

( * ) Notice: Subject to any disclaimer, the term of this patent is extended or adjusted under 35 U.S.C. 154(b) by 603 days.

This patent is subject to a terminal disclaimer.

(21) Appl. No.: 10/427,039

(22) Filed: Apr. 30, 2003

(65) Prior Publication Data

US 2003/0228005 A1 Dec. 11, 2003

Related U.S. Application Data

(63) Continuation-in-part of application No. 09/698,793, filed on Oct. 27, 2000, now Pat. No. 6,868,419.

(60) Provisional application No. 60/441,348, filed on Jan. 20, 2003, provisional application No. 60/376,592, filed on Apr. 30, 2002.

(51) Int. Cl.
*H04L 27/00* (2006.01)
(52) U.S. Cl. .................. 375/259; 375/240.01
(58) Field of Classification Search ............ 375/240.01
See application file for complete search history.

(56) References Cited

U.S. PATENT DOCUMENTS 3,818,117 A * 6/1974 Reyner et al. ............ 174/36
5,418,721 A * 5/1995 Arai et al. ............... 701/35
5,461,318 A * 10/1995 Borchert et al. ............ 324/533
5,677,927 A * 10/1997 Fullerton et al. ........... 375/130
5,982,276 A   11/1999 Stewart
6,111,356 A * 8/2000 Roitman et al. ............ 313/506
6,133,912 A * 10/2000 Montero ................... 715/716

(Continued)

FOREIGN PATENT DOCUMENTS

WO    WO 00/41383    12/1999

(Continued)

OTHER PUBLICATIONS

Merriam-Webster's Collegiate Dictionary, Tenth Edition, principal copyright 1993, p. 158.*

(Continued)

*Primary Examiner*—Curtis B. Odom
(74) *Attorney, Agent, or Firm*—McKee Voorhees & Sease, P.L.C.

(57) ABSTRACT

The present invention provides for a methods, system, and apparatus relating to data transmission. One method of the present invention includes representing data using at least one pulse based on a Gaussian wave form, sending the at least one pulse over an electrically conductive guided media, and recovering the data from the at least one pulse. The present invention can be used in conjunction with telephony applications, cable tv applications, and data bus applications.

76 Claims, 21 Drawing Sheets

U.S. PATENT DOCUMENTS

| | | |
|---|---|---|
| 6,185,290 B1 | 2/2001 | Shaffer et al. |
| 6,195,484 B1 | 2/2001 | Brennan, III et al. |
| 6,236,652 B1 | 5/2001 | Preston et al. |
| 6,430,208 B1 | 8/2002 | Fullerton et al. |
| 6,437,832 B1 * | 8/2002 | Grabb et al. ............ 348/614 |
| 6,496,104 B2 | 12/2002 | Kline |
| 6,505,032 B1 * | 1/2003 | McCorkle et al. ........ 455/41.2 |
| 6,532,256 B2 | 3/2003 | Miller |
| 6,532,260 B2 * | 3/2003 | Oi ........................... 375/238 |
| 6,781,530 B2 | 8/2004 | Moore |
| 6,782,048 B2 | 8/2004 | Santhoff |
| 6,834,073 B1 * | 12/2004 | Miller et al. ............. 375/130 |
| 7,013,145 B1 * | 3/2006 | Centore, III ............. 455/454 |
| 2001/0036183 A1 | 11/2001 | Melick et al. |
| 2001/0053175 A1 | 12/2001 | Hoctor et al. |
| 2002/0076193 A1 | 6/2002 | Melick |
| 2002/0097790 A1 | 7/2002 | Dress, Jr. et al. |
| 2003/0095063 A1 | 5/2003 | Fullerton |

FOREIGN PATENT DOCUMENTS

| | | |
|---|---|---|
| WO | WO 00/54488 | 9/2000 |
| WO | PCT/US03/13818 | 4/2003 |

OTHER PUBLICATIONS

Pulse Link, Inc. "Ultra Wideband Over Cable Technologies: Enhancing Cable Television Bandwidth Capacity Without Modification to Existing Infrastructure." 2002.

* cited by examiner

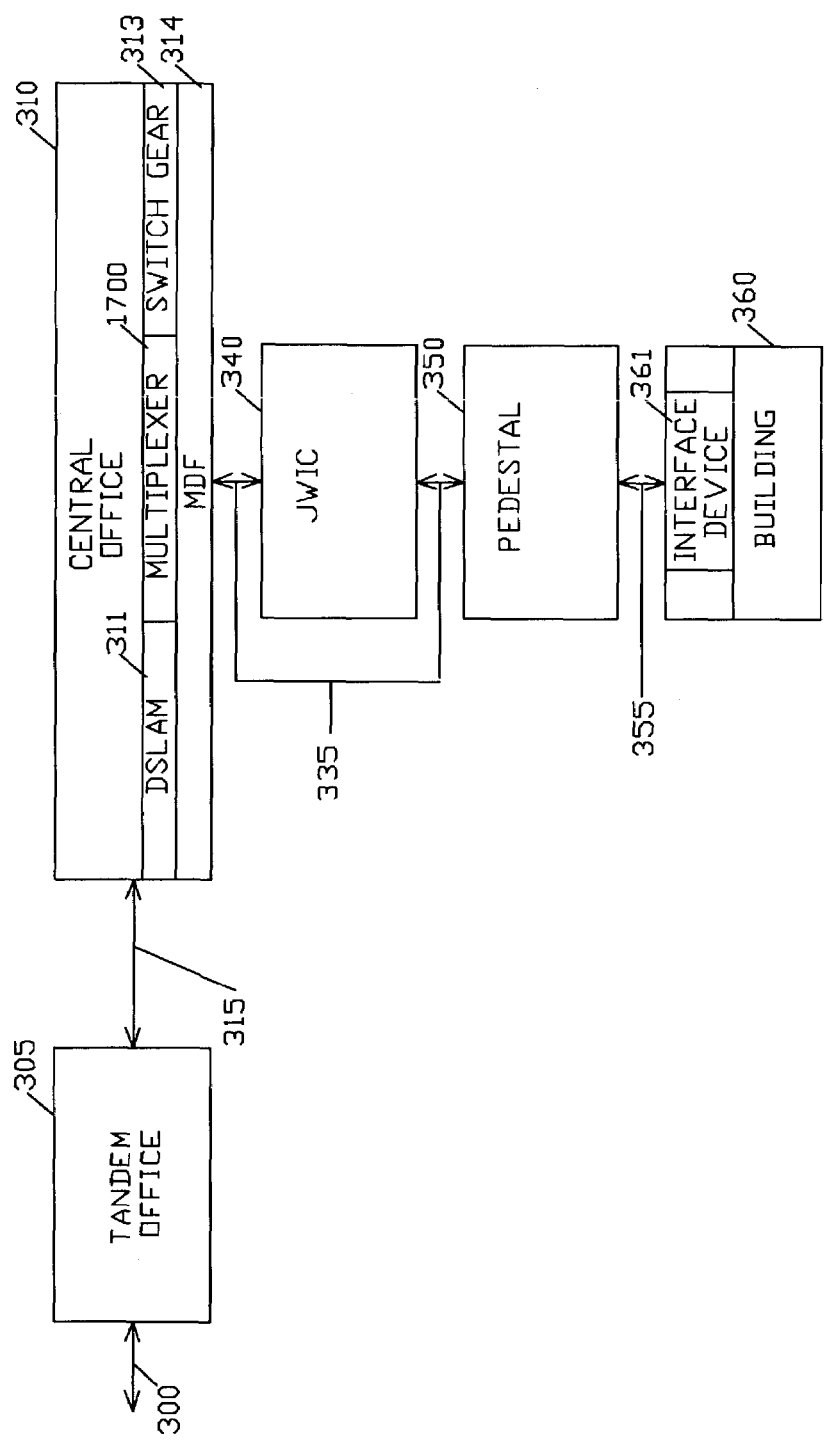

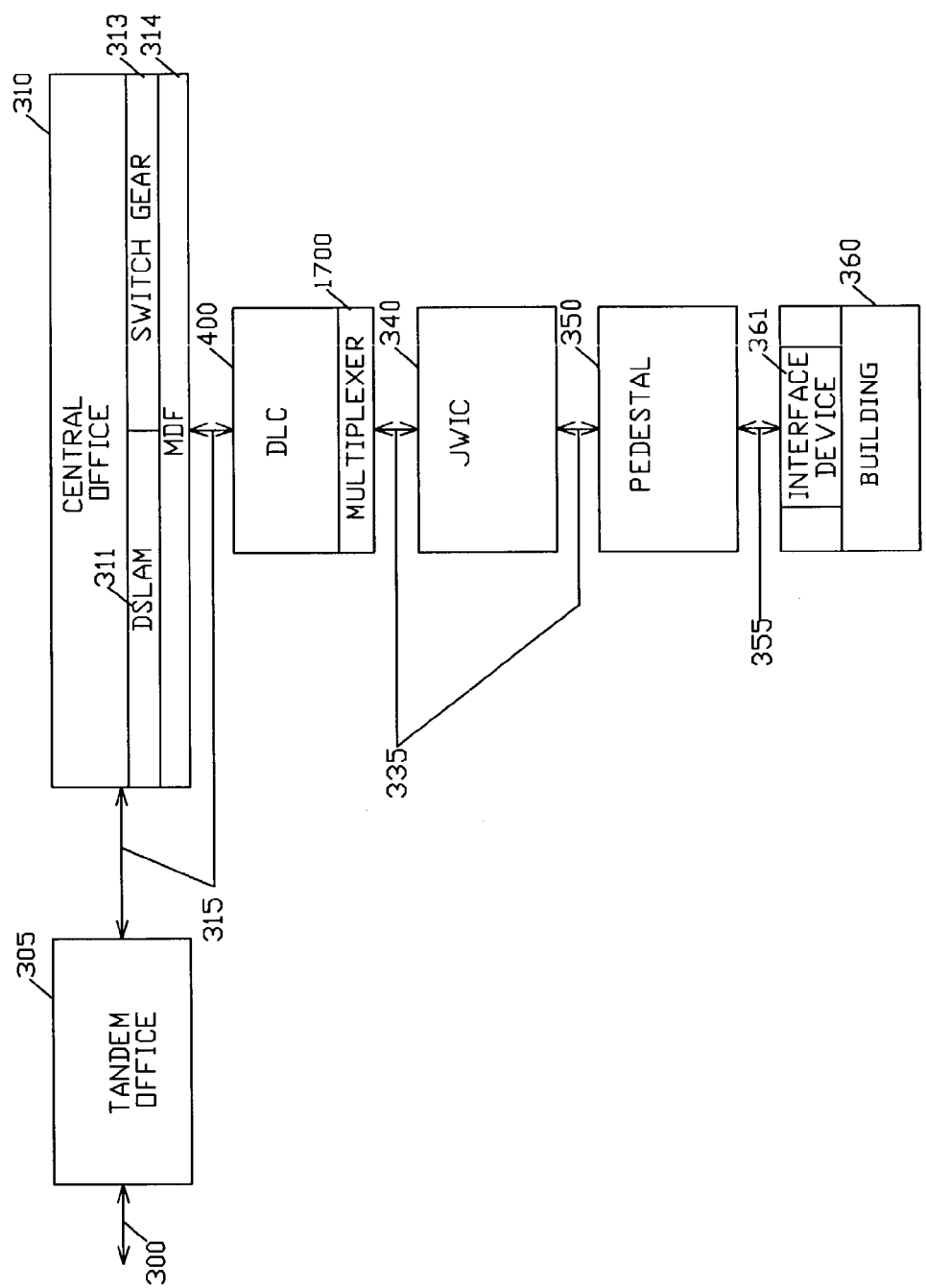

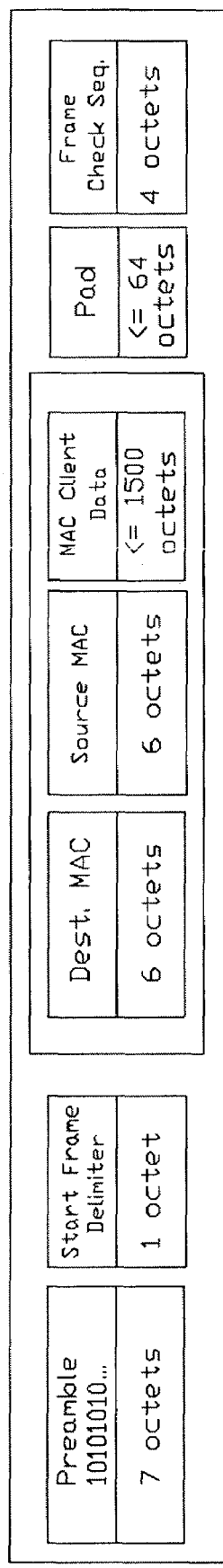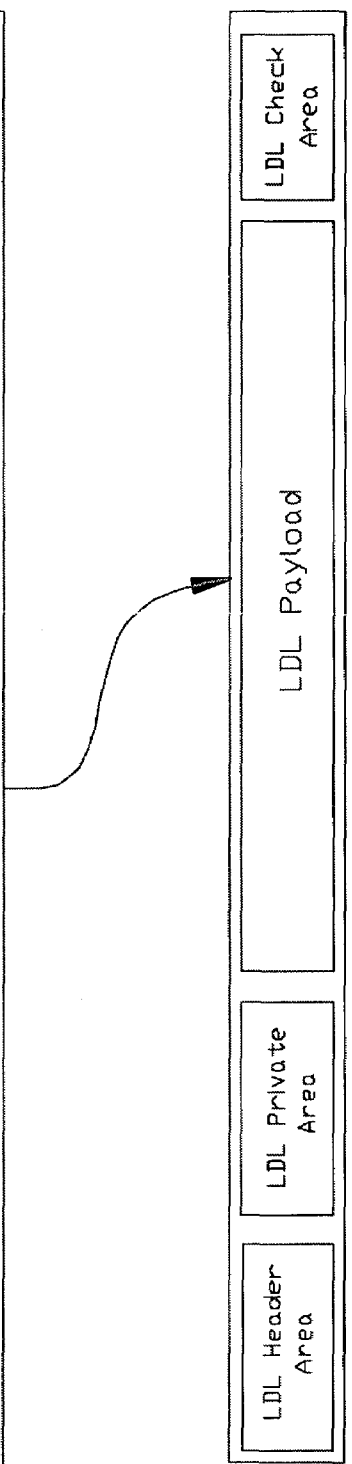
FIG. 8

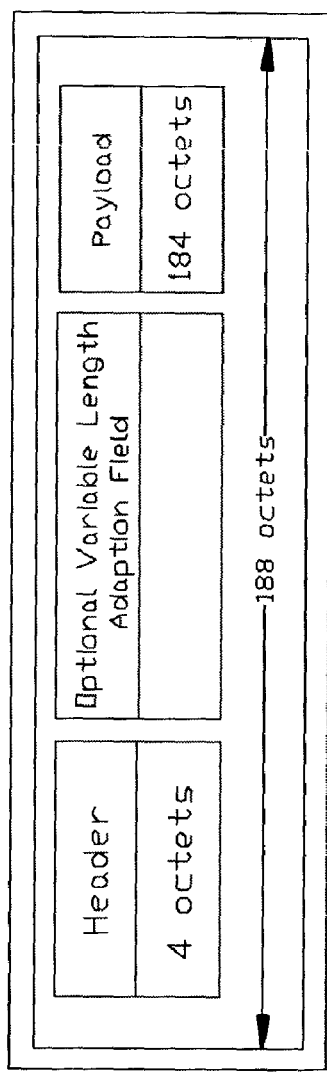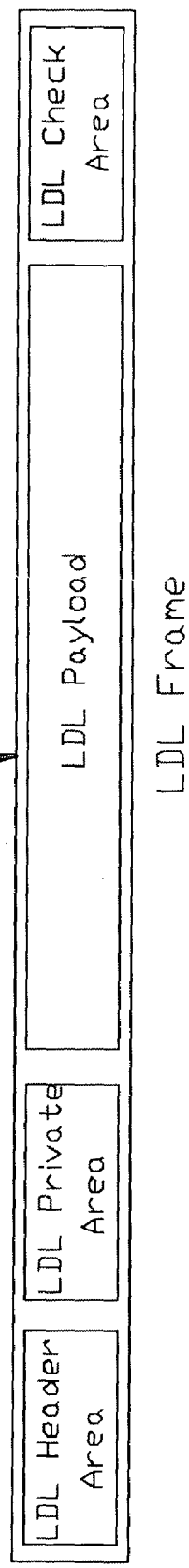
FIG. 11

HIGH BANDWIDTH DATA TRANSPORT SYSTEM

CROSS-REFERENCE TO RELATED APPLICATIONS

This application is a conversion of and claims priority to prior U.S. Provisional Patent Applications, Ser. No. 60/376,592 entitled HIGH NUMBER BASED ENCODED ULTRA WIDEBAND OVER GUIDED AND NON-GUIDED NARROW BAND RADIO filed on Apr. 30, 2002 and Ser. No. 60/441,348, entitled HIGH-BANDWIDTH DATA TRANSPORT SYSTEM, filed on Jan. 20, 2003. This application is also a continuation-in-part of Ser. No. 09/698,793 entitled METHOD OF TRANSMITTING DATA INCLUDING A STRUCTURED LINEAR DATABASE, filed on Oct. 27, 2000, now U.S. Pat. No. 6,868,419, all of which are herein incorporated by reference in their entirety.

FIELD OF THE INVENTION

The present invention relates generally to a system, method and apparatus for increasing the bandwidth of guided line networks using particular types of pulse transmissions. In particular, the present invention relates to the use of pulses to transmit data over guided lines, such as, but not limited to, coaxial cable, telephone twisted pair, Category 5 cable, power lines, other conductive mediums, such as but not limited to, metallic car and truck bodies, ship and submarine hulls, decks and bulkheads, aircraft fuselages, structural steel, missile bodies, tank bodies, water pipes, etc., and non-metallic mediums, such as but not limited to, the human body, etc., non-guided narrow band wireless carrier signals, or any combinations of the above, including hybrid networks which use the present invention in conjunction with fiber optic and/or non-guided wireless networks.

PROBLEMS IN THE ART

There are several trends in society that are creating an unprecedented need for bandwidth by consumers and businesses. Some of these result from the advent of the "digital age." Today, digitally encoded music can be played on MP3 and Compact Disc (CD) players designed for portable use, in automobiles, and homes. Digitally encoded voice is commonplace technology for cell phones and other forms of wireless telephones. Digitally encoded video can be watched from Digital Versatile Disk players (DVD), Direct Broadcast Satellite (DBS) Receivers, Personal Video Recorders (TiVo), digital camcorders and High Definition Televisions (HDTV). In addition, machines using digitally encoded data, such as the Personal Computer, and game stations, such as, XBox, Playstation 2 and Nintendo 64 are now ubiquitous.

The rise of the Internet and networks has provided ubiquitous connectivity for businesses and consumers alike, but are being constrained by the lack of true broadband availability. In December 1995, there were 16 million Internet connections worldwide. By August of 2001, that number had grown to 513 million.

Also, the demand for broadband connectivity continues to grow. This is a result of the increased number of users accessing remote sources of digitally encoded data and data intensive applications. Initially, Internet content was largely text-based and provided limited amount of services. However, the Internet has grown to provide more bandwidth intensive content filled with pictures, graphics, and video clips. In the future, the increase of available bandwidth will enable higher quality Internet content such as full motion video, entertainment quality video, streaming video and audio.

Even though there is currently a glut of high-speed fiber optic backbone capacity, with an overall utilization rate of only 3% to 5%, the access network, or what is commonly referred to as the "last mile", simply cannot keep pace with the need and desire for higher speed access to larger amounts of digital information.

There are many individuals and organizations who view the need to provide broadband connectivity as a matter of national importance. The Technology Network (TechNet), an organization of CEOs from the nation's leading technology companies, has called on the federal government to adopt a goal of 100 megabits per second to 100 million homes and small businesses by 2010. TechNet states, "If most Americans had high speed Internet access, whether by wire line, wireless, satellite or cable, consumers could benefit from access to multimedia, interactive distance learning, increased telecommuting, higher productivity, easier interaction with government, improved health care services, and on-demand entertainment. Currently, the vast majority of so-called "broadband" connections (i.e. Cable Modem and DSL) operate at less than 2 megabytes per second.

The Internet currently is built with many components capable of providing bandwidth at very high data transmission rates. However, the major impediment to the delivery of high-bandwidth Internet content and services is the transmission constraints from the major Internet pipes to the customer's home or business, also known as the "last mile."

Today, there are four basic technologies used for "last mile" access: fiber, telephone twisted pair, cable, and wireless. To put these technologies in perspective, the following chart compares the maximum bandwidth available with a number of common Layer 1 and 2 technologies (Layer 2 technologies are shown in italics).

CHART 1

TECHNOLOGY AND MAXIMUM BAND WIDTH

| TECHNOLOGY | MAXIMUM BANDWIDTH |
| --- | --- |
| Fiber Optics | 10 Gbps (and beyond with DWDM) |
| Laser | 1 Gbps |
| *Ethernet* | *1 Gbps* |
| *ATM* | *622 Mbps (and beyond)* |
| Microwave | 155 Mbps |
| Satellite | 155 Mbps (experimental 622 Mbps) |
| Ultra Wideband | 100 Mbps |
| LMDS | 100 Mbps |
| *TechNet's Recommendation* | *100 Mbps/Home or Small Business* |
| VDSL | 52 Mbps |
| Cable codecs | 30 Mbps |
| ADSL | 9 Mbps |
| HDSL | 2 Mbps |
| E1 leased line | 2 Mbps |
| ISDN PRI | 2 Mbps |
| *Frame Relay* | *2 Mbps, 45 Mbps - specs up to 622 Mbps* |
| ISDN BRI | 128 Kbps |
| Analog codecs | 56 Kbps |

FIBER OPTIC BROADBAND SOLUTIONS—In the past few years there have been dramatic changes in the capacity of these "last mile" access technologies. As shown in Chart 1, fiber optic networks have the greatest long-term promise to provided substantial broadband connectivity. Wave Division Multiplexing (WDM) and Dense Wave Division Multiplexing (DWDM) are technologies that divide the optical beam on a single fiber strand into its component colors (different wavelengths). Equipment manufacturers are increasing wavelength channel rates up to 40 Gbps. Each individual wavelength can carry as much information as previously passed through the entire fiber strand.

One of the main attractions of WDM and DWDM is they can be installed on existing fiber without digging it up, which means lower installation costs for additional capacity. This technology is already having an influence on lowering the cost of long-haul transport, but has yet to make an impact in "last mile" connectivity, largely due to the high cost of laying fiber to the building.

Even though fiber to the building is not a cost-effective near-term solution for providing broadband connectivity to the business or consumers, other "last mile" technologies including wireless, telephone twisted pair, and cable are evolving as stop-gap measures to overcome this need.

Wireless Broadband Solutions—There are a number of technologies that fall under the wireless broadband heading. These include technologies such as LMDS (Local Multi-point Distribution Service), MMDS (Multi-channel Multi-point Distribution Service), point-to-point radio and multi-point/multi-hop radio, microwave, laser, and satellite systems.

Microwave is a fixed wireless broadband technology. With capacity of up to 155 Mbps and a range of 3-60 miles, microwave is very effective for transmission to remote locations. Many private companies, universities and alternate carriers have deployed microwave transmission services where it is not economically feasible to install fiber or utilize transmission services from incumbent providers.

Microwave services face a number of challenges. First, microwave requires line of sight placement of transmitter and receiver, which often means obtaining planning permission for transmitters. Secondly, service providers are restricted to bands of frequencies licensed/allocated by the government, and acquiring spectrum is an expensive proposition. Finally, weather-related interference, particularly in the form of rain, can impact service. Error-corrective techniques can be used to compensate for bad weather, but this involves increasing power and/or decreasing cell size. Microwave tends to be a solution for business, rather than the consumer.

Local Multipoint Distribution System (LMDS) is a microwave wireless technology that can deliver up to 100 Mbps per customer site. This is a point-to-multipoint distribution service, which utilizes microwave radio technology in the 25 GHz and higher frequency bands. However, it is constrained, in that it requires line-of-site between the central hub LMDS node and the customer's building, with a maximum distance of up to 5 km. One of the key advantages of LMDS (and other wireless technologies) is its' rapid deployment capabilities. However, LMDS is a line-of-sight technology, and is susceptible to rain fade.

Wireless radio systems often have to overcome interference caused by multi-path signal propagation. Technology from Cisco Systems and others, however, is overcoming the multi-path-interference problem caused by foliage and increasing the bandwidth possible with non-line-of-sight receivers. Cisco's technology, called Vector Orthogonal Frequency Division Multiplexing, only increases overall bandwidth by a mere 20 percent.

Satellite transmissions utilize radio frequencies, usually in the microwave range, and can operate in either a one- or two-way mode. Satellites can be used to deliver digital services to geographically distributed, remote locations that fixed wire lines can't reach. It's ideally suited to difficult terrain, such as the outback. Services include multipoint broadcasts as well as point-to-point delivery.

One of the key issues for satellite transmission is the propagation delay, which can range from 250 to 500 milliseconds (ms). This delay can cause problems with real-time applications, such as voice, and other delay sensitive applications, which may require spoofing to avoid unnecessary retransmission.

An emerging wireless technology recently given approval by the FCC is Ultra Wideband (UWB). This is an impulse radio system which uses digitally modulated pulses of energy instead of modulated oscillating waves. UWB has many potential advantages, including: lower cost, low power, ultra secure transmissions, and broadband speeds. However, the FCC has regulated UWB's effective operating range by limiting the overall power with which it can operate in air.

Two companies, AirFiber and Terabeam are using unlicensed spectrum in the optical frequency range, known as free-space optics, or fiberless optics as a method to solve the "last mile" problem. They are using lasers designed to be efficient and ultra-fast, with speeds as high as 1,000 megabits per second. However, these systems are susceptible to fog, which requires sophisticated auto gain features, and closer spacing of the nodes in the network. Also, as these systems will frequently be mounted on tall buildings that sway, this necessitates a sophisticated targeting mechanism to keep the optical link operational. These systems are being limited in practice to distances of 700-1000 feet, which makes the cost of the network very expensive.

Telephone Twisted Pair Broadband Solutions—With over 700 million telephone twisted pair phone lines worldwide, copper is a ubiquitous asset that represents a multibillion-dollar network infrastructure. Carriers have consistently searched for ways to revitalize the copper loop plant, with Integrated Services Digital Network (ISDN), Digital Subscriber Line (DSL), Inverse Multiplexing over ATM (IMA), and (Very-high-data-rate Digital Subscriber Line) VDSL as examples of attempts to harness copper for high-speed service delivery.

However, cross talk interference is the major problem for service providers using telephone twisted pair for high-speed transmission. Throughout the network, adjacent copper lines are typically bundled into a cable binder in groups of 25 or 50. Multiple connections that share a common frequency experience a mingling of transmission signals, which distort the output signal. The cross talk phenomenon causes bit error rates (BER). Also, telephone twisted pairs have distance constraints related to high frequency signal attenuation and capacitance, which has historically limited the potential of twisted pair copper for delivering ultra high-speed services.

Digital Subscriber Line technology is rapidly evolving to try and overcome these limitations. Symmetricom is one company trying to enable broadband with their GoWide product. This is a new generation Integrated Access Device (IAD) that combines one to eight individual copper phone lines to create a single circuit with data rates up to 15 Mbps of dedicated bandwidth. GoWide 9.2 Mbps combines symmetric DSL transport, known as G.shdsl, with Inverse Multiplexing over ATM (IMA) to deliver end-to-end bandwidth of 9.2 Mbps via a 10Base-T Ethernet TCP/IP port. G.shdsl is the new generation of DSL approved by the ITU (an international standards body). G.shdsl has very low noise characteristics and a very low probability of interfering with other services in adjacent copper pairs. Unlike proprietary SDSL, G.shdsl is already supported by major DSLAM, chipset, and other infrastructure vendors, meaning the DSLAMs already in place for ADSL residential services represent a ready-made infrastructure for delivering G.shdsl-based business services with simple line card upgrades. Although Symmetricom's solutions are a quantum leap in dedicated bandwidth of up to 15 Mbps, this is not enough to deliver a single uncompressed HDTV channel over long loop distances on the public switched telephone network (PSTN).

In addition, DSL technology must take into account spectrum management techniques to stay within prescribed levels of Power Spectral Density (PSD) for Far End Cross Talk (FEXT) and Near End Cross Talk (NEXT) in order to make the maximum bandwidth available in any particular binder group. ANSI standard T1.417 entitled "Spectrum Management For Loop Transmission Systems" provides spectrum management requirements and recommendations for the administration of services and technologies that use metallic subscriber loop cables. The following include requirements and recommendations for DSL line spectrum management classes and specified loop technologies:

power spectral density (PSD)
total average power
transverse balance
longitudinal output voltage
deployment guidelines Spectral management, particularly Dynamic Spectral Management (DSM), adds another layer of complexity to DSL and other telephone loop technologies.

Cable TV Broadband Solutions—Some of the 11,000 cable television (CATV) systems in the United States, which are shared user networks, are delivering broadband access over their CATV network infrastructure. However, due to CATV networks technology and standards constraints, CATV networks are rapidly running out of available bandwidth to service their customers. As a result, several companies are developing new technologies to facilitate the allocation of additional bandwidth on these networks.

One such company, Chinook Communication, provides a technology that takes advantage of the inefficient nature of a video signal, and mixes video, data, and voice signals within the spaces of a single megahertz video channel. This is an improvement over other CATV technologies, which simply adds data on top of the video stream, or uses compression methods to funnel data alongside the video stream in the last mile. However, the amount of cumulative bandwidth Chinook can squeeze out of a typical cable plant is only 500 Mbps. Although Chinook's technology is an improvement in bandwidth, it is not a significant enough for a typical shared user environment provided by a CATV network, which may have as many as 750 to 1000 users on a node.

Narad Networks also provides a broadband solution for existing Hybrid Fiber-Coax networks (HFC) by implementing a switched Ethernet technology to deliver various voice, data, and media services over Internet Protocol (IP). This solution requires a CATV operator to replace some or all of their existing cable network hardware with Narad Network's Optical Network Distribution Switch, Network Distribution Switch, Subscriber Access Switch, and Broadband Interface Unit. By replacing this network hardware, Narad is able to exploit spectrum in the 860 MHz to 2.5 GHz range. However, the Narad solution is costly because it requires a large capital investment and only provides 1 Gbps of additional shared network bandwidth.

Rainmaker Technologies also provides a broadband solution for existing CATV networks using their patented Wavelet technology. This type of technology is disclosed in U.S. Pat. No. 6,532,256 entitled METHOD AND APPARATUS FOR SIGNAL TRANSMISSION AND RECEPTION. Rainmaker's technology uses "wavelets" which are orthogonal transforms that allow for the precise control of both the frequency and time of the modulation and modulation symbols. In a full implementation, the benefit of this technology is an approximate 10× increase in available bandwidth to an individual subscriber on a CATV network.

Power Line Broadband Solutions—Another emerging guided line technology is broadband data delivery over electric power distribution lines. Digital PowerLine, developed by Northern Telecom and United Utilities, is capable of transmitting data at a rate of 1 Mbps over existing electric power distribution infrastructure. Through "conditioning" of the existing electricity infrastructure, electrical utilities can transmit regular low frequency signals at 50 to 60 Hz and much higher frequency signals above 1 MHz without affecting either signal. The lower frequency signals carry power, while the higher frequency signals can transmit data.

Digital PowerLine uses a High Frequency Conditioned Power Network (HFCPN) technology to transmit data and electrical signals. A HFCPN uses a series of Conditioning Units (CU) to filter those separate signals. The CU sends electricity to the outlets in the home and data signals to a communication module or "service unit", which provides multiple channels for data, voice, etc. Base station servers at local electricity substations connect to the Internet via fiber or broadband transports. The network topology of a HFCPN-based network is similar to that found in a traditional Local Area Network (LAN).

While this demonstrates a novel use of electrical power lines for data transport, this technology in its current state is barely competitive with existing DSL services operating at 1 Mbps, and again, far below TechNet's recommendation to the government for 100 Mbps connectivity to the home, or small business, by the year 2010.

Media Fusion, LLC is also using power lines as means to delivery video, data, and voice transmission. This company's patent pending technology, Advanced Sub-Carrier Modulation (ASCM), uses existing electric grid infrastructure and the invisible magnetic field created by active power lines to transmit data at a high rate, and delivers it to any standard electric outlet. For more information, refer to U.S. Pat. No. 5,982,276 entitled MAGNETIC FIELD BASED POWER TRANSMISSION LINE COMMUNICATION METHOD AND SYSTEM. However, the potential benefits of this technology are unproven in the field.

Data Bus—In addition to global telecommunication networks, there are various local telecommunication networks employing the use of a data buses for use in factories, buildings, cars, trucks, ships, aircraft, buses, etc. A data bus is defined as one or more transmission mediums that serve as a common connection to transfer data between groups of related devices. Data buses incorporate many different architectures and standards and their use as a transmission medium is limited by their complexity and limited data rate.

A consortium of leading automotive companies is shortening the design cycle for data buses by defining the industry's first set of interface standards for automotive information, communications and entertainment systems. The Automotive Multimedia Interface Collaboration (AMIC) and the Telematics Suppliers Consortium is creating a set of open-standard hardware interfaces and programming interfaces for application software. The intelligent transportation systems' data bus (ITSDB) will ideally provide a universal backplane for swapping electronics equipment in new-generation automotive systems.

Although auto manufacturers are using multiplex buses to interconnect sensors and devices, there remain a number of problems. For a variety of reasons, auto companies have hesitated to adopt a single multiplex bus standard. As a result, electronic-device manufacturers must design and build multiple versions of their products to attach to these various buses, which increase the manufacturing costs that are typically passed along to the consumer. Furthermore, devices connected to the auto's multiplex bus are required to be qualified through the standard automobile design process. This constraint does not allow for future "unplanned" or ad-hoc electronics and features to be added by the manufacturer, the dealer or the customer.

Dual bus architecture is currently being developed that allows an ITSDB to be connected to the auto's multiplex bus through a gateway. This will enable electronic-device manufacturers to build a single, automotive version of their product that plugs into any auto that employs dual bus architecture. The gateway, under the control of the auto company, would act as a firewall, allowing only authorized message traffic to pass between the auto's multiplex bus and the ITSDB's devices, ensuring safe operation of all vehicle systems.

In addition to traditional data bus uses on an auto, by implementing ITSDB and dual bus on an auto, new services and applications can be enabled such as: wireless Internet access, remote vehicle diagnostics, security/authentication codes for e-commerce or read diagnostic information from vehicle computers, sensors or air bags.

A higher-speed bus is being designed to handle multimedia applications in the vehicle, tentatively called IDB-Multimedia (IDBM). This bus will transport digitalized audio and video, with a mechanism for guaranteed message delivery when required by the application.

Unshielded twisted pair is the preferred medium for the automotive data bus because of its cost effectiveness and reduced complexity. However, this type of medium is challenging within an environment that generates large amounts of signal noise, EMF, and other forms of electrical interference.

A widely used data bus is MIL-STD-1553, which is the United States military standard that defines the electrical, mechanical and timing specifications for a dual-redundant communication 1 Mbps data bus network that interconnects up to 31 cooperating digital units in a system. This communication network, also referred to as a data bus, is typically used in avionics systems, but is also used in submarines, tanks and missiles. It is highly reliable because of its extremely low error rate (one word fault per 10 million words), and because of its dual-redundant architecture.

Military aircraft, such as the F-16 Fighting Falcon, C-130 Hercules Transport, B-1 Bomber, and the AH-64 Apache attack helicopter, utilize products built to the MIL-STD-1553 standard. A MIL-STD-1553 data bus allows complex electronic subsystems to interact with each other and the on-board flight computer. This data bus is the life line of the aircraft.

Missiles and Smart Bombs, such as ASRAAM (Advanced Short Range Air to Air Missile), AIM-9X, and WCMD (Wind Corrected Munitions Dispenser), have become more sophisticated and resultantly more precise and lethal with the advancement of microelectronics. These weapon systems also benefit from the use of the MWL-STD-1553 data bus system. Just as aircraft use the data bus to enable the interaction between its sub-systems, missiles and smart bombs also use the MIL-STD-1553 data bus to download information from the aircraft just prior to launch and to coordinate information flow during the flight of the weapon.

Ground vehicles such as the M1A2 Tank, Bradley troop transport, and the Crusader self propelled howitzer have also evolved into highly technical, highly sophisticated mechanisms and use MIL-STD-1553 data buses for data links between their electrical subsystems.

The MIL-STD-1553 data bus is used in satellites, space shuttle payloads, and on the International Space Station. Manufacturers have applied the standard to manufacturing production lines and commercial systems including subways, such as the Bay Area Rapid Transit (BART). MIL-STD-1553B has also been accepted and implemented by NATO and many foreign governments. The UK has issued Def Stan 00-18 (Part 2) and NATO has published STANAG 3838 AVS, both of which are versions of MIL-STD-1553B. However, similarly to the MIL-STD-1533 standard, these additional military standards do not provide high-speed data transport rates.

Another series of buses have been developed for Supervisory Control and Data Acquisition (SCADA). This is a software package positioned on top of hardware to which it is interfaced, in general via Programmable Logic Controllers (PLCs), or other commercial hardware modules to gather real time information for process control of equipment. SCADA systems are used in industrial processes such as steel making, power generation and distribution, chemical, etc. The sensors used in a SCADA bus generally transmit information over a few thousand to tens of thousands input/output (I/O) channels.

Buses also provide a method for data servers to communicate with process controllers in the field. The Controller Area Network (CAN) standard developed by Bosch and Intel in 1990 is a bus standard that provides for the network of independent controllers.

CAN bus can use multiple baud rates up to 1 Mbps. The most common baud rates are 125 kbps and 250 kbps. The CAN bus communication enables bus loads of up to 100% (data being transmitted all the time and all nodes can transmit), allowing full usage of the nominal bit rate.

CAN bus is also a synchronous network, where all receiving modules synchronize to the data coming from a transmitting module. One of the problems with the CAN bus is the electrical characteristics of the CAN bus cable which restricts the cable length according to the selected bit rate. As an example, the maximum bus length with a bit rate of 10 kbps is 1 km, and the shortest with 1 Mbps is 40 meters. In standard industrial environments, the CAN bus uses standard cabling without shielding, or twisted-pair wiring.

The problems related to designing and deploying high speed "last mile" access networks, high speed LANs, and high speed data buses can be summarized by high costs, as with bringing fiber to the building, or co-habitation issues associated with DSL and other loop technologies, and the physical limitations of sine oriented technologies to achieve high data rates over long distances on guided and non-guided mediums.

Therefore, what is needed is a cost-effective solution that provides very high bandwidth for buses, LANs, and "last mile" access networks, which overcomes these problems, and other limitations of current technology.

FEATURES OF THE INVENTION

A general feature of the present invention is the provision of a system, method and apparatus for increasing the bandwidth of guided line mediums, which overcomes the problems found in the prior art.

A further feature of the present invention is the use of pulses, which are capable of being used for the transmission of data at a high rate over high attenuation and capacitance mediums.

A further feature of the present invention is the modulation of pulses by polarity.

A further feature of the present invention is the modulation of pulses by position in time.

A further feature of the present invention is the modulation of pulses by amplitude.

A further feature of the present invention is the modulation of pulses by frequency.

A further feature of the present invention is the modulation of pulses by phase.

A further feature of the present invention is the modulation of pulses by VP Encoding.

A further feature of the present invention is the modulation of multiple pulses with or without pulse compression methods.

A further feature of the present invention is the modulation of pulses by any combination of polarity, time, amplitude, frequency, and phase.

A further feature of the present invention is the encoding of data or symbols in Base 2 numbers of pulses.

A further feature of the present invention is the encoding of data or symbols in higher than Base 2 numbers of pulses.

A further feature of the present invention is simplex signaling.

A further feature of the present invention is half-duplex signaling.

A further feature of the present invention is full-duplex signaling.

A further feature of the present invention is synchronous signaling.

A further feature of the present invention is asynchronous signaling.

A further feature of the present invention is an enhanced broadband transmission system with a point-to-point topology.

A further feature of the present invention is an enhanced broadband transmission system using a loop topology.

A further feature of the present invention is an enhanced broadband transmission system that is designed for a single user access.

A further feature of the present invention is an enhanced broadband transmission system that is designed for multiple user access.

A further feature of the present invention is its deployment over "last mile" access network topologies.

A further feature of the present invention is a "last mile" access network configured as a telephone loop plant.

A further feature of the present invention is a telephone loop configured to use one wire of a telephone twisted pair for forward and the other for reverse.

A further feature of the present invention is a telephone loop configured to use both wires of a telephone twisted pair for multiplexed forward and reverse transmissions.

A further feature of the present invention is a "last mile" access network configured as a Cable TV network.

A further feature of the present invention is a "last mile" access network configured as a power distribution network.

A further feature of the present invention is its deployment over local area network (LANs) topologies.

A further feature of the present invention is its deployment over data bus topologies.

A further feature of the present invention is its deployment using any combination of "last mile" access network, LAN, and data bus topologies.

A further feature of the present invention is connection to a "last mile" access network, or LAN, or data bus using a single transmission medium.

A further feature of the present invention is connection to a "last mile" access network, or LAN, or data bus using a plurality of transmission mediums of a single type.

A further feature of the present invention is connection to a "last mile" access network, or LAN, or data bus using a plurality of transmission mediums of a plurality of types.

A further feature of the present invention is the use of telephone twisted pair as a transmission medium.

A further feature of the present invention is the use of coaxial cable as a transmission medium.

A further feature of the present invention is the use of power lines as a transmission medium.

A further feature of the present invention is the use of shielded pair wire as a transmission medium.

A further feature of the present invention is the use of metallic vehicle bodies and frames as a transmission medium.

A further feature of the present invention is the use of structural steel as a transmission medium.

A further feature of the present invention is the use of railroad rail as a transmission medium.

A further feature of the present invention is the use of reinforcing bar as a transmission medium.

A further feature of the present invention is the use of metallic water pipe or other forms of metallic pipeline transport as a transmission medium.

A further feature of the present invention is the use of metal desks as a transmission medium.

A further feature of the present invention is the use of computer backplanes as a transmission medium.

A further feature of the present invention is the use of drill stem as a transmission medium.

A further feature of the present invention is the use of other conductive medium as a transmission medium.

A further feature of the present invention is the use of combinations of above as a transmission medium.

A further feature of the present invention is the use of the human body as a broadband data bus transmission medium.

A further feature of the present invention is the use of a single frequency channel to transmit pulses.

A further feature of the present invention is the use of multiple frequency channels to transmit pulses.

A further feature of the present invention is the use of time division multiplexing for multiple channels, multiple users and/or multiple device access over a single frequency channel on individual or multiple transmission mediums.

A further feature of the present invention is the use of code division multiplexing for multiple channels, multiple users and/or multiple device access over a single frequency channel operating on individual or multiple transmission mediums.

A further feature of the present invention is the use of time division multiplexing for multiple channels, multiple users and/or multiple device access over multiple frequency channels operating on individual or multiple transmission mediums.

A further feature of the present invention is the use of code division multiplexing for multiple channels, multiple users and/or multiple device access over multiple frequency channels operating on individual or multiple transmission mediums.

A further feature of the present invention is the use of an individual or plurality of sub-carriers.

A further feature of the present invention is the use of public and private access codes.

A further feature of the present invention is the provision of high security through the low probability of intercept and detection characteristics of transmissions.

A further feature of the present invention is the provision of an efficient data encapsulation protocol.

A further feature of the present invention is the provision of a multiplexer.

A further feature of the present invention is the provision of a transceiver/processor.

A further feature of the present invention is the provision of intermediate field repeaters.

A further feature of the present invention is the provision of multiplexers, switches, intermediate field repeaters, routers, client transceiver/processors, and other devices that switch data as pulses.

A further feature of the present invention is the provision for a client device to operate as a "Home/PNA" local director.

A further feature of the present invention is the provision for a multiplexer that is configured operates as a "Home/PNA" remote director.

A further feature of the present invention is an enhanced broadband delivery system that is designed to operate as a unified messaging system.

A further feature of the present invention is an enhanced broadband delivery system in which multiplexers serve as a concatenation point for a unified messaging system.

A further feature of the present invention is the use of geo-position as a routing mechanism.

A further feature of the present invention is the use of printed and video bar codes as a pulsed telecommunication data source.

A further feature of the present invention is the inclusion of data and symbol compression methods and systems within the transport.

A further feature of the present invention is the inclusion of data and symbol encryption and other security methods and systems within the transport.

A further feature of the present invention is the inclusion of manual and automated transmission tuning and conditioning systems and methods.

A further feature of the present invention is the use of priority, service type, stream identification, destination address, intermediate address, origination address, protocol type, network conditions (blockage, availability, route costs, quality of service, etc.), security rules and other standard network routing and switching metrics to route and switch data. The invention allows for unicast or multicast.

One or more of these and/or other objects, features, or advantages of the present invention will become apparent from the specification and claims that follow.

SUMMARY OF THE INVENTION

The present invention is a system, method and apparatus for increasing the bandwidth of guided line networks using pulse transmissions. The pulses of the present invention are short, low duty cycle pulses based on a Gaussian waveform and its various derivatives, or combinations of more than one of such pulses. These pulses enable a high data rate over increased distances on metallic or other electrically conductive mediums, including, but not limited to fast rise time, ultra-wide frequency spread, unique time domain and frequency domain signatures, etc. The pulses of the present invention exhibit a unique time domain signature and wideband frequency domain signature.

The present invention includes the use of pulses to transmit data over electrically conductive guided lines, such as, but not limited to, coaxial cable, telephone twisted pair, Category 5 cable, power lines, other conductive mediums, such as but not limited to, metallic car and truck bodies, ship and submarine hulls, decks and bulkheads, aircraft fuselages, structural steel, missile bodies, tank bodies, water pipes, etc., and non-metallic mediums, such as but not limited to, the human body, etc., or any combinations of the above.

According to one aspect of the invention, a method is provided for operating in a public switched telephone network (PSTN). Pulses are transmitted and received near, or in the noise range of the PSTN network, which may also be providing other services such as voice, video, and data, by means other than the pulses of the present invention. In addition, a plurality of applications and components are provided that are used for the support, operation, management and delivery of services and products.

According to another aspect of the present invention, a method is provided for operating in a Cable Television (CATV) network. Within this embodiment, pulses are transmitted and received near, or in the noise range of the CATV network, which may also be providing other services such as voice, video, and data by means other than the pulses of the present invention.

According to another aspect of the present invention, a method is provided for operating with a LAN, which transmits and receives pulses operating near, or in the noise range of the LAN network, which may be running voice, video, and data traffic by means other than the pulses of the present invention.

According to another aspect of the present invention, a method is provided for use with a data bus, which transmits and receives pulses operating near, or in the noise range of the data bus, which may be running voice, video, and data traffic by means other than the pulses of the present invention.

In addition, various enhancements to each aspect of the invention are described, including, but not limited to unified messaging, geo-based routing, pulse switching, etc.

Also, a general description of development work performed by the inventors will be described.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 3 is a block diagram of a PSTN network topology configured in accordance with the preferred embodiment of the present invention.

FIG. 4 is an illustration of a PSTN network topology with intermediate field electronics configured in accordance with an alternate embodiment of the present invention.

FIG. 8 is an illustration of an Ethernet Network PDU encapsulated in an LDL packet.

FIG. 11 is an illustration of a MPEG-2 TS PDU encapsulated in an LDL packet.

DETAILED DESCRIPTION OF THE PRESENT INVENTION

Figure 1A:
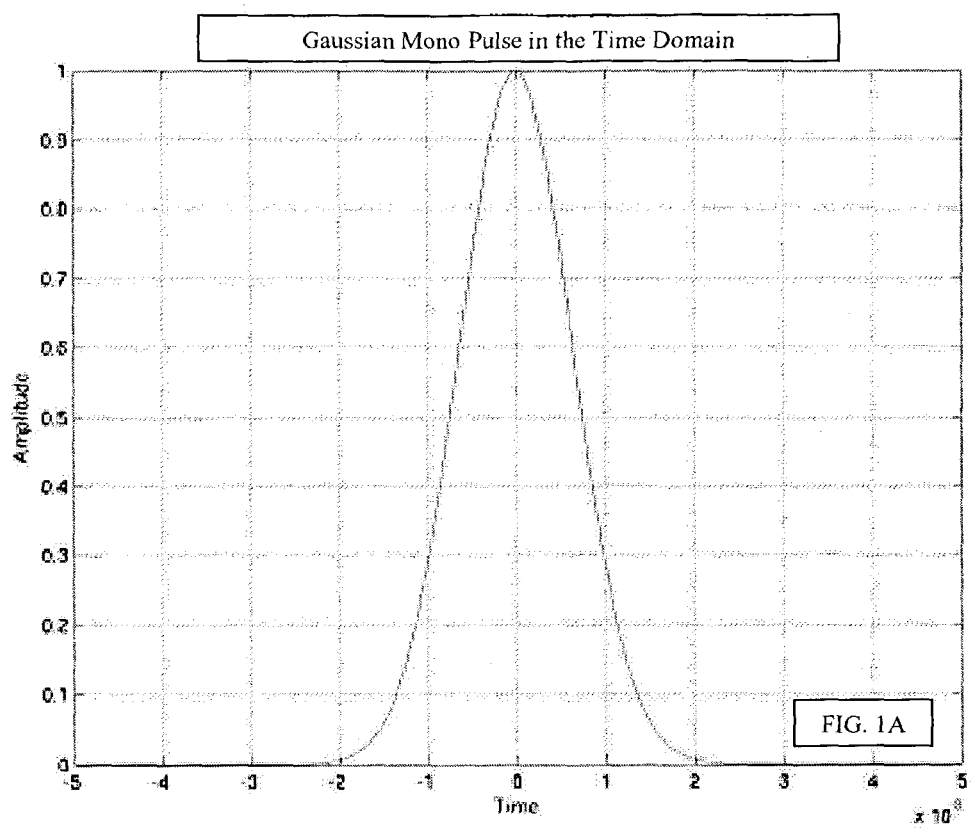
FIG. 1A is a graph of a Gaussian mono pulse in the time domain.
Figure 1B:
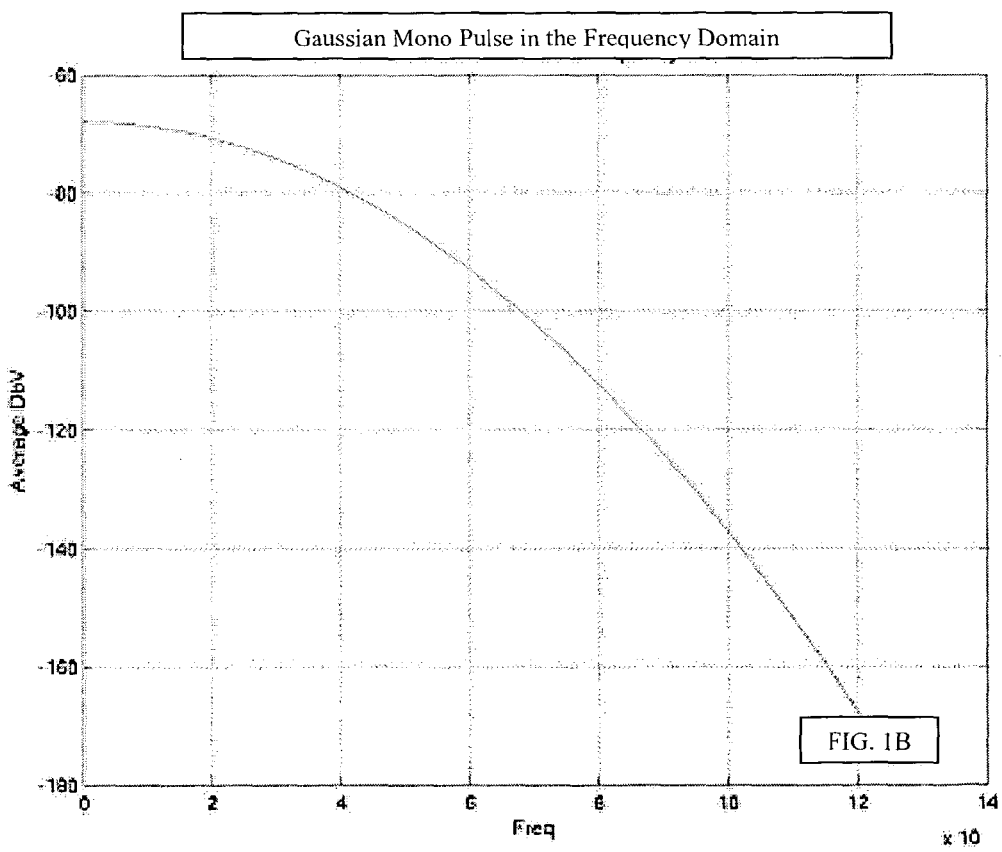
FIG. 1B is a graph of a Gaussian mono pulse in the frequency domain.
Figure 1C:
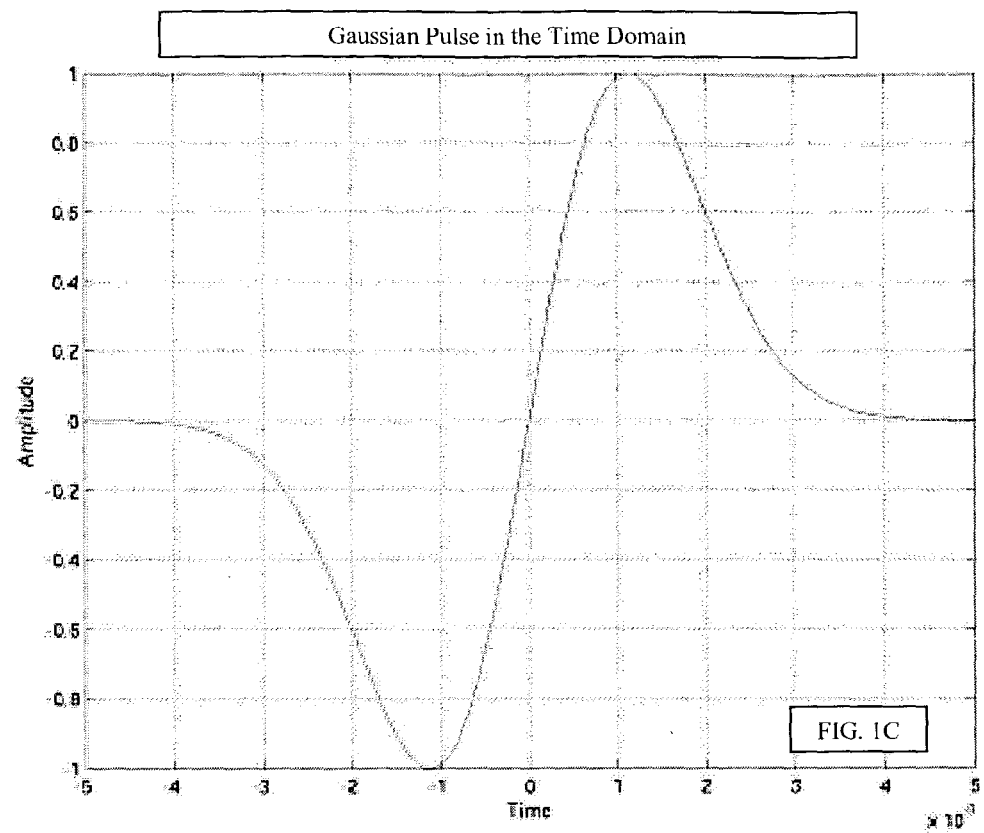
FIG. 1C a graph of a Gaussian pulse in the time domain.
Figure 1D:
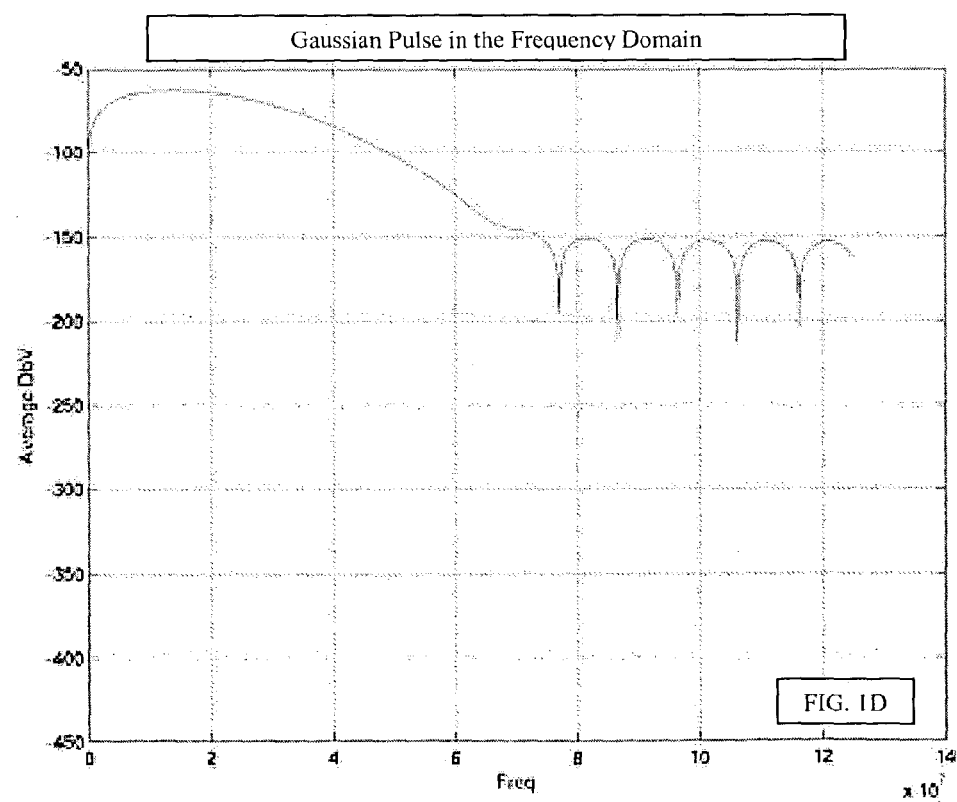
FIG. 1D is a graph of a Gaussian pulse in the frequency domain.
Figure 1E:
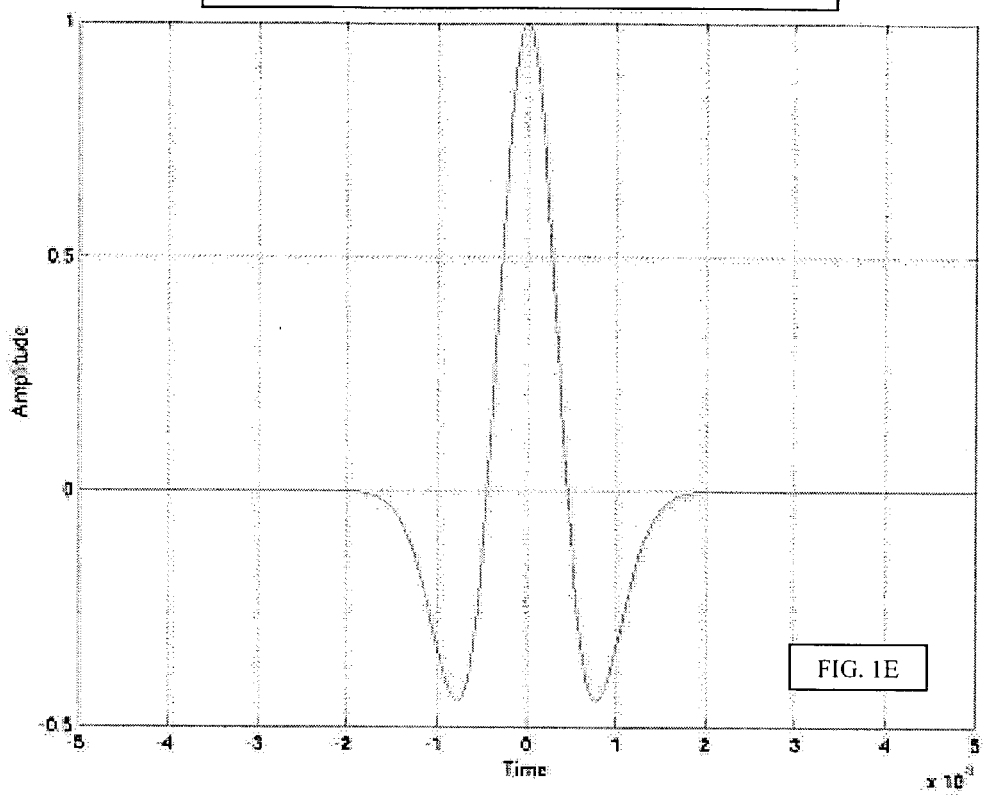
FIG. 1E a graph of a Gaussian doublet pulse in the time domain.
Figure 1F:
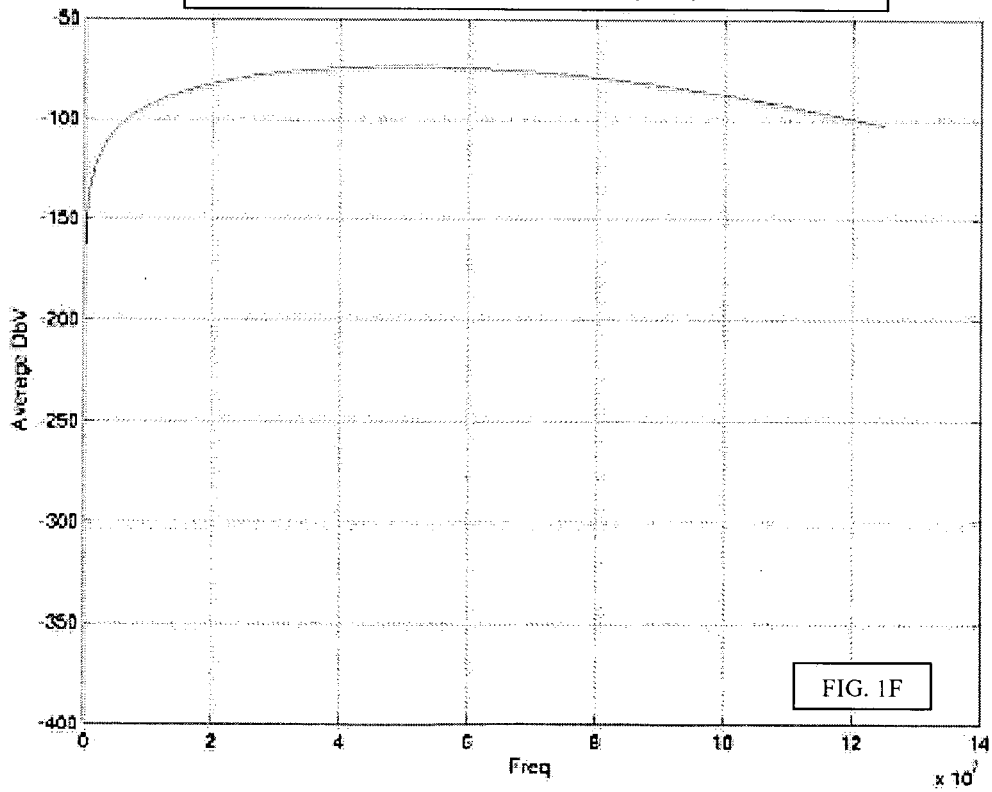
FIG. 1F is a graph of a Gaussian doublet pulse in the frequency domain.

The present invention is a departure from existing impulse radio techniques used for wireless transmission of data. In order to introduce the reader to the present invention, the following technology overview is provided as a precursor to the specific embodiments of the present invention. The intention of this overview is to assist the reader with the understanding of the present invention, and should not be used to limit the scope of the present invention.

One aspect of the present invention refers to a radio frequency system designed for use in high attenuation and capacitance environments which are commonly found on metallic guided-line conductors, such as but not limited to, telephone twisted pair, coaxial cable, Category 5 cable, power lines, other conductive mediums, such as but not limited to, metallic car and truck bodies, ship and submarine hulls, decks and bulkheads, aircraft fuselages, structural steel, missile bodies, tank bodies, water pipes, etc. The term "electrically conductive guided media" is used to include the above mentioned metallic guided-media conductors while excluding transmissions over the air or optical transmissions either over the air via laser or view optical fiber.

The pulses of the present invention are short, low duty cycle pulses. The duration and duty cycle of the pulses vary with the particular medium being used. For a guided media such as telephone twisted pair the practical range of duration of the center channel frequency of the pulses is between 300 KHz and 150 MHz, which equate to pulse durations of 2650 nanoseconds to 6.67 nanoseconds respectively. The upper center channel frequency on telephone twisted pair is limited by the phenomenon of radiation which begins to occur around 100 MHz. The overall duty cycle per unit of time is variable, and is dependant on the product of the pulse repetition frequency times a given pulse duration. The minimum practical pulse repetition frequency is dependant on the acceptable jitter for a given window of time. The length of the telephone twisted pair loop also plays a factor in which center channel frequency is used to achieve the maximum data rate at any particular transmission distance. The longer the loop, the lower the acceptable pulse center channel frequency.

For a guided media such as a coaxial cable the practical range of duration of the center channel frequency of the pulses is between 300 KHz and up to 2 GHz, which equate to pulse durations of 2650 nanoseconds to 0.50025 nanoseconds. One skilled in the art will recognize that the appropriate center channel frequency is dependant on the gauge, or mixture of gauges, of the guided medium, the proximity to sources of interference, the quality of the insulation, grounding, whether or not the cable is shielded, and other factors such may exist in a particular application or environment.

These pulses are based on the Gaussian waveform, and various derivatives including, but not limited to, a first derivative Gaussian mono-pulse, a second derivative Gaussian doublet, etc., or combinations of one or more of these pulses. A Gaussian waveform, is of course, significantly and mathematically different from a sine-based waveform, sawtooth waveform, triangular waveform, square waveform, gated sine waveform, and variants of those waveforms modulated by frequency, amplitude and phase. The Gaussian waveform of the present invention is critical to providing the benefits of the present invention. These pulses can also be formed by one or more waveforms that produce desired characteristics including, but not limited to fast rise time, ultra-wide frequency spread, unique time domain and frequency domain signatures, etc. The pulses exhibit a unique time domain signature and wideband frequency domain signature. The present invention's time domain signature is a result of the time shift keying of periodic pulses, which have well-defined zero crossing and peaks. The present invention's pulses are recovered in the time domain by searching for the location of a specific amount of energy in a sample window. The sent and received pulses are a time reference against which other pulses are measured. Of course, since the present invention relates to Gaussian waveforms, time domain signatures based on sine-based waveform, sawtooth waveform, triangular waveform, square waveform, gated sine waveform, and variants of those waveforms modulated by frequency, amplitude and phase are excluded from consideration, as well as any other time domain signature caused by continuous phase carriers as opposed to the Gaussian waveform-based pulses of the present invention.

The frequency domain signature is ultra-wide band in nature because fast rise time pulses are used. The pulses are therefore transmitted over a huge spread of frequency, and narrow-band, periodic signals are therefore excluded from consideration, including frequency domain signatures of sine-based waveforms, sawtooth waveforms, triangular waveforms, square waveforms, gated sine waveforms, and variants of those waveforms.

The pulse characteristics enable increased distance and data throughput performance of the system over existing technologies. Particular attention must be paid to the radiation of the pulse energy in unshielded metallic environments, such as telephone twisted pairs. For example, radiation occurs at approximately 100 Mhz on a telephone twisted pair, which means relatively wide pulses, compared to those used over air, or a coaxial cable, must be designed for use in this high attenuation, high capacitance medium.

The advantage of the pulses of the present invention are their unique time domain signature. This signature enables a receiving device to determine the location of a pulse through a process called correlation. Correlation indicates a coincidence of energy when a replica of the sent pulse is multiplied by a received pulse signal. This coincidence known as the auto-correlation (a form of correlation), enables the detection of the pulse position in very specific time locations. The correlation process is used to detect pulses at very low signal to noise (SNR) levels, even down into the noise floor. The detection of these low SNR level signals is possible due to the coincidence of energy versus the signal with respect to noise.

There are two advantages of these pulses in the frequency domain: the ability to coexist with existing telecommunications technologies on copper wires, and the ability to filter and correlate the received signal.

A pulse of the present invention spreads energy to beyond 25% of the center frequency which causes the signal to appear as noise to most narrowband, wave-oriented communication systems. On a telephone loop, this characteristic limits the far-end and near-end crosstalk interference with other technologies operating on adjacent wires. In addition, this characteristic allows pulse-based services of the present invention to co-exist on the same wire operating with other services such as, but not limited to voice, DSL, etc.

The pulses illustrated in FIGS. 1a-1f are spread in frequency in excess of 400% of the center frequency. The pulses of the present invention create power spectra that are dramatically wider than traditional spread spectrum technologies, which allow signals to be transmitted faster and further than traditional narrowband methods.

In addition, the pulses of the present invention may be shaped spectrally to control the signal bandwidth, limit out of band emissions, in-band spectral flatness, time domain peak power, or adequate on-off attenuation ratios, etc. The pulses may be produced by various methods that are known to one of ordinary skill in the art.

The system of the present invention can also be used to transmit one or more data bits per pulse, or may use multiple pulses to transmit a single data bit. An uncoded, unmodulated pulse train containing a regularly occurring pattern of pulses will produce in the frequency domain a set of comb lines within the power spectrum of a single pulse. These comb lines identify areas of peak power and can cause interference with other services transmitting on the same or nearby wire.

In order to reduce the areas of peak power noted in the comb lines above, the energy can be spread more uniformly by using pseudo-random noise (PN) codes to dither each pulse in a pulse train relative to each pulse's nominal position. A PN code is a set of time positions that define the positioning for each pulse in a sequence of pulses.

The PN code can also be used to provide a method of establishing independent communication channels for multiple users, or devices operating over a single metallic medium. Multiple users, or devices, operating random individual clocks and different PN codes can be designed to have low cross correlation. Therefore, a pulse train using one PN code will statistically seldom collide with pulses using another PN code.

In addition to PN codes, there are other methods of channelization on the same metallic medium, such as, but not limited to time division multiplexing, frequency division multiplexing, etc.

Any characteristics, or combinations of characteristics, of pulse waveforms can be modulated to convey information. These include, but are not limited to, amplitude modulation, phase modulation, frequency modulation, time shift modulation, polarity (flip) modulation, M-ary, and those described in U.S. patent application Ser. No. 09/812,545, to Melick, et al, entitled SYSTEM AND METHOD OF USING VARIABLE PULSES FOR SYMBOLOGY. Modulation may be in either analog or digital forms.

One simple form of modulation is binary phase modulation which may be used to transmit binary information. Binary phase modulation uses a single symbol to convey a binary "1" when its pulse is transmitted in a specified phase and a binary "0" when its pulse is transmitted in a phase shifted 180 degrees. As an example, a series of binary phase modulated pulses transmitted at a frequency of 10 MHz sends 10 million pulses per second, yielding a symbol or data transmission rate of 10 Mbps.

A number of M-ary modulation methods (where M equals number of bits per symbol) provide for further data throughput capacity due to modulation. A 4-ary modulation method defines unique locations of the pulse center for each symbol. One method of M-ary modulation used for wireless ultra-wideband is called pulse positioning modulation (PPM.) The normal implementation of PPM uses a nominal location to indicate the expected arrival position or time of a pulse. A PPM transmitter delays or advances the pulse by a constant amount of time from its nominal position in order to modulate information. A PPM receiver simply evaluates whether its pulse arrived "early" or "late" in relation to its expected arrival time or position. For example, a series of PPM pulses can be transmitted at a rate of one per second. Because the receiver of PPM pulses expects pulses to arrive at a rate of one per second, a value can be assigned to the arriving pulse depending if it arrived 250 milliseconds (ms) early or 250 ms late.

For illustrative purposes, we will describe the pulse modulation as one of the preferred methods of modulation implemented in the present invention. The pulse modulation includes the use of pulse positioning characteristics provided in M-ary modulation schemes such as PPM. However, the pulse modulation focuses on evaluating "how late" a pulse arrives from its expected nominal position, versus PPM's method of simply evaluating whether a pulse has arrived early or late in relation to its expected nominal position. As an example, a 2-ary pulse modulation scheme based upon a 10 Mhz pulse that is able to deliver two bits of information within the transmission of a single pulse. A 10 MHz pulse requires 100 nanoseconds in time to transmit. The modulation would define two time locations, with the first one as the nominal time or the expected time of the pulse. The second time location is 2.5 nanoseconds late, or after the nominal time. As a result, the total time required to transmit a single pulse is 102.5 ns. This yields a data throughput rate of approximately 9.75 Mbps.

To implement a 3-ary modulation scheme, simply add another time location of 2.5 ns after the second location, which is also 5 ns after the nominal position.

Combining methods of modulation can also be used transmit additional information. For example, if we continued using the 2-ary pulse modulation scheme described previously, in combination with phase modulation, we could transmit data an additional two values for a total of four different value combinations within the same amount of time.

In phase modulation, the transmitted 2-ary modulated pulse would be sent 0 or 180 degrees out of phase for an additional two more values within the same 102.5 ns of time.

The following chart describes the different values:

CHART 2

2-ARY PULSE MODULATION EXAMPLE

| 4-ary Value | Phase | Delay |
| --- | --- | --- |
| "00" | 0 | 0 |
| "01" | 180 | 0 |
| "10" | 0 | 2.5 ns |
| "11" | 180 | 2.5 ns |

By increasing the potential value combinations, the data throughput yield has doubled from 9.75 Mbps in our 2-ary pulse modulated example to 19.5 Mbps in our 4-ary modulated example. As illustrated in the example above with 2-ary pulse modulation and phase modulation, there are other pulse modulation methods that can also be used in combination with each other that provide for a variety of performance levels.

PPM or pulse modulation methods as illustrated above provide for several unique advantages over traditional transmission methods in the demodulation process. PPM and pulse demodulation methods include the use of a correlator for the decoding and demodulation of a received PPM and pulse signal of the present invention.

The correlator method of matched filtering is implemented by cross-correlating the received pulse with a replica or model of the transmitted pulse shape, and then filtering the result. Received pulses that match the model of a transmitted pulse produce positive correlation results, while noise or interference signals do not. The decision about the presence or absence of a pulse can be made using a "maximum likelihood of detection" algorithm.

The receiver's synchronization hardware and software use a precise clock signal that marks the beginning of a time frame for each sequence of "n" pulses. This clock signal is derived from the correlator output of a matched filter dedicated to identifying the unique pulse shape, also called the sync pulse, associated with clock signal. The sync pulse is transmitted frequently enough, for example, one for every sequence of "n" pulses, to maintain timing synchronization. A delay-lock loop, or phase-lock loop are also methods that can be used to maintain good system synchronization between the transmitting and receiving devices.

The present invention's pulses are tolerant of interference because of their large processing gain. For example, a direct sequence spread spectrum system with a 10 MHz channel bandwidth to a 10 KHz information bandwidth yields a processing gain of 1000 times the information bandwidth, which is equal to 30 decibels (dB).

As the pulse repetition rates increase, a receiver may be prevented from integrating received pulse samples. In these cases a sub-carrier may be used to enhance interference mitigation and increase the capability to correlate a signal.

Exemplary Embodiments

The basis of the present invention is the specific, a priori knowledge of the transmission timing, and the existence and characteristics of a particular pulse. Whereas wave-oriented communications seek to extract the meaning of a wave, the present invention focuses simply on the existence of a pre-defined pulse, within a pre-defined window of time, on an electrically conducting wave guide such as a metallic medium. The key components of the technology are the pulses, the modulation of the pulses in time and/or phase, and the control of transmission power.

Recent advances in wireless communications technology have resulted in an emerging, revolutionary ultra wide band technology (UWB) called impulse radio communications systems (hereinafter called impulse radio). Although pulses are wideband in nature and similar to ones found in wireless UWB or impulse, the science of using them over long distances on a high attenuation and capacitance metallic mediums such as telephone twisted pair loops, coaxial cable, and power lines is significantly different.

To better understand the benefits of wireless impulse radio to the present invention, the following review of impulse radio follows and was first fully described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,363,108 (issued Nov. 8, 1994) to Larry W. Fullerton. A second generation of wireless impulse radio patents includes U.S. Pat. No. 5,677,927 (issued Oct. 14, 1997), U.S. Pat. No. 5,687,169 (issued Nov. 11, 1997) and U.S. Pat. No. 5,832,035 (issued Nov. 3, 1998) to Fullerton et al. The aforementioned patents are hereby included in entirety by reference as they describe a number of circuits, filters, correlators, methods, techniques, etc., that are useful in the present invention.

Exemplary uses of wireless impulse radio systems are described in U.S. patent application Ser. No. 09/332,502, entitled, "System and Method for Intrusion Detection Using a Time Domain Radar Array," and U.S. patent application Ser. No. 09/332,503, entitled, "Wide Area Time Domain Radar Array," both filed on Jun. 14, 1999, and both of which are assigned to Time Domain Corporation. Methods and techniques described in these patents are useful in the present invention, and they are incorporated herein in their entirety by reference.

It is often desirable when building wireless impulse radio receivers to include a sub-carrier with the baseband signal to help reduce the effects of amplifier drift and low frequency noise. The sub-carrier that is typically implemented alternately reverses modulation according to a known pattern at a rate faster than the data rate. This same pattern is then used to reverse the process and restore the original data pattern. These sub-carrier modulation methods are described in further detail in U.S. Pat. No. 5,677,927 to Fullerton et al, and may be useful in the present invention, and therefore, that patent is herein incorporated in entirety by reference.

Figure 2A:
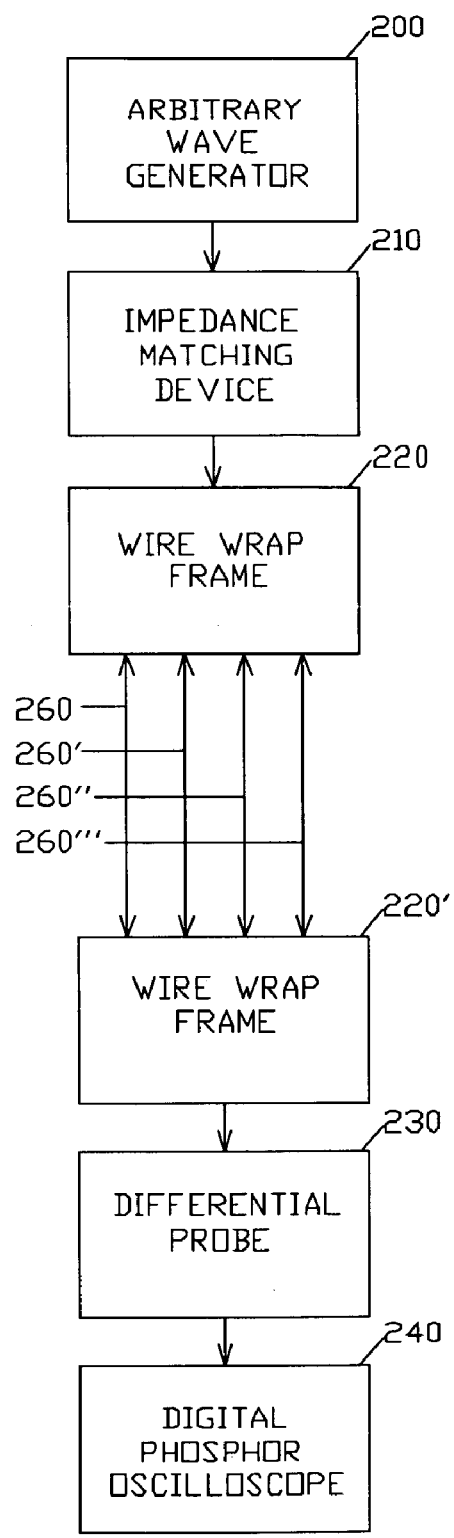
FIG. 2A is a block diagram of a test environment configured with telephone twisted pair.
Figure 2B:
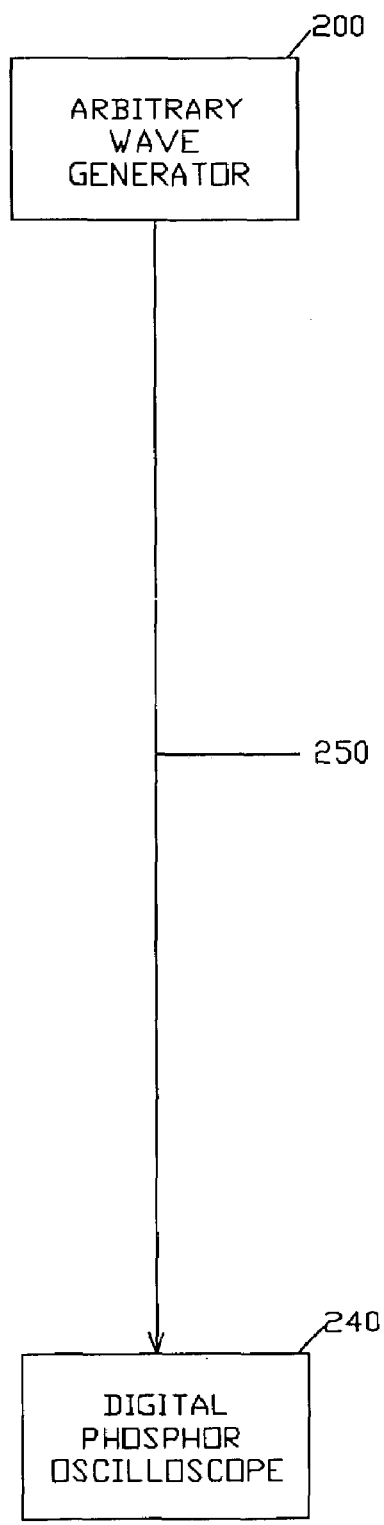
FIG. 2B is a block diagram of a test environment configured with coaxial cable.

In order to validate a number of assumptions, the inventors have implemented a testing environment as shown in FIG. 2a and FIG. 2b. The equipment in the prototype for the preferred embodiment of the present invention, as shown in FIG. 2a, are of both standard and proprietary nature and include: four loops of three pair, 22-gauge telephone twisted pair (TTP) underground cable 260, 260', 260'', 260''', arbitrary wave generator 200, impedance matching device 210, wire wrap frames 220, 220', differential probe 230, and computer programs for pre- and post-processing received data signals are used.

This cable 260, 260', 260'', 260''' is typical of the type used by phone companies. The cables 260, 260', 260'', 260''' range in length from approximately 1,740 feet long to over 5,000 feet long. The totally length of cables 260, 260', 260'', 260''' available through cross connections exceeds 14,000 feet.

The equipment in the prototype for an alternate embodiment of the present invention is shown in FIG. 2b and include arbitrary wave generator 200, 2,500 feet of RG-58 (50 ohm) coaxial cable 250, and digital phosphor oscilloscope 240.

The TTP cables 260, 260', 260'', 260''' are terminated in our lab from different entrances to ensure no cross-radiation between transmission and reception. The termination is a typical mainframe wire-wrap used in most telephone companies. The cables 260, 260', 260'', 260''' are grounded at the transmission end to a dedicated ground rod to ensure a pure ground.

The transmission generator is a Tektronix AWG-710 Arbitrary Wave Generator, capable of generating analog pulse trains from digital information at the rate of up to 4 billion samples per second (4 GSamp/sec). The generator is capable of delivering up to 2 volts peak to peak. The bandwidth of the generator is over 1.25 GHz.

The receive oscilloscope is a Tektronix 7404 Digital Phosphor Oscilloscope. The scope is capable of sampling at 20 GSamp/sec. The bandwidth of the scope is over 4 GHz. There are limitations of the scope specifically associated with the sampling rate. For example, the scope cannot sample at 250 picoseconds (4 GSamp/Sec), the output of the generator. In order to sample at this rate, we currently sample at 50 picoseconds (20 GSamp/second) and decimate the signal by a factor of 5.

The generation of a pulse train is accomplished using a combination of MatLab and C programs. The binary information is modulated into pulse positions using a C routine, and the resulting pulse train is generated in MatLab. The pulse train is transferred via File Transfer Protocol (FTP) to the generator for transmission. As the generator transmits the pulse train over the transmission cables, the scope captures the pulse train transmission and saves the pulse train capture to the MatLab machine for post processing. The synchronization of the pulse is currently established by manual inspection and is accomplished by placing a single pulse a few microseconds ahead of the pulse train. This synchronization pulse provides for the determination of the beginning of the pulse train. Also, the inclusion of an additional timing pulse in the stream of modulated pulses containing the data further refines the synchronization of the pulse train.

The inventors have used this test scenario to generate, modulate, receive, and demodulate a wide variety of pulse shapes and derivatives, PN coding schemes, pulse center channel frequencies, etc., in order to successfully transmit and receive pulses over the entire combined length of cable at data rates that exceed state-of-the art Digital Subscriber Line (DSL) and Cable TV (CATV) cable modem technologies by one to two orders of magnitude.

In addition to the basic equipment shown in FIG. 2a and FIG. 2b, the inventors have built a number of proprietary boards to filter and amplify the transmitted and received signal in order to improve performance of the arbitrary wave generator 200 and digital phosphor oscilloscope 240.

The arbitrary wave generator, digital phosphor oscilloscope, MatLab programs, and filter and amplification boards have also been connected to a live loop exceeding 17,000 feet at a rural local telephone company. This environment had other technologies operating in the same binder group including, Asymmetric Digital Subscriber Line (ADSL), Elastic Ethernet, and Plain Old Telephone Service (POTS). Pulses of the present invention were transmitted and successfully received over this loop at a data rate nearly one order of magnitude faster than the best DSL technology currently available.

In addition, the inventors have successfully tested over other mediums such as water pipe, metallic car bodies, etc.

The present invention may be configured to use a wide variety of network topologies. The following chart includes, but is not limited to, the following topologies which may be configured in loops, or point-to-point, or a combination.

CHART 3

NETWORK TOPOLOGY DEFINITIONS

SWITCHED ACCESS NETWORKS

| | |
|---|---|
| Telephone | Single Interface/User |
| Telephone | Multiple Interfaces/User |
| SHARED ACCESS NETWORKS | |
| Cable TV | Single Interface/User |
| Cable TV | Multiple Interfaces/User |
| Power Line | Single Interface/User |
| Power Line | Multiple Interfaces/User |
| LAN | Single Interfaces/User |
| LAN | Multiple Interfaces/User |
| BUS | Single Interface/User |
| BUS | Multiple Interfaces/User |
| HYBRID NETWORKS | |
| Any Combination of Telephone, Cable TV, Power Line, Wireless, LAN, PAN, BUS | Single Interface/User |
| Any Combination of Telephone, Cable TV, Power Line, Wireless, LAN, PAN, BUS | Multiple Interfaces/User |

The present invention's network topologies may be configured to use a wide variety of mediums for transporting data. The following chart includes, but is not limited to, the following mediums:

CHART 4

TRANSPORT MEDIUMS

GUIDED MEDIUMS

Telephone Twisted Pairs (TTP)
Coaxial Cables
CAT-5 Wiring
Power Lines (Long Distance Power Distribution)
Power Lines (In-Building)
Metallic Pipes
Railroad Rails
Drill Stem
Highway Rebar
Vehicle Frames & Bodies (Including Cars, Trucks, Tanks, Airplanes, Tanks, Cranes, Etc.)
Missile & Rocket Bodies
Metal Desks
Desks & Benches With Metallic Bus Strips (Including Wooden Desks, Kitchen Counters, Lab Benches, Etc.)

CHART 4-continued

TRANSPORT MEDIUMS

GUIDED MEDIUMS

Compute Device Backplanes
Narrow Band Sine-Wave Carriers Operating Over Guided Mediums The present invention's network topologies may be configured to use a wide variety of directions and methods for transporting data. The following chart includes, but is not limited to, the following common methods:

CHART 5

TRANSPORT DIRECTIONS, METHODS

TRANSMISSION DIRECTIONS

Simplex - One direction only.
Half-Duplex - Bi-directional, one direction at a time.
Full-Duplex - Bi-directional, both directions at the same time. The upstream and downstream directions may be symmetrical, or asymmetrical in bandwidth.
METHODS FOR ACCOMMODATING MULTIPLE USERS/DEVICES Synchronous Time Division Multiplexed
Asynchronous Time Division Multiplexed
Code Division Multiplexed
Frequency Division Multiplexed Specific Topologies "Last Mile" Access Network Topologies—FIG. 3 illustrates the preferred embodiment of the present invention is configured as a Public Switched Telephone Network (PSTN) topology without any intermediate field electronics, such as a Digital Loop Carrier (DLC) 400 as shown in FIG. 4. The present invention deployed on a PSTN may operate a single private multiplexed downstream and upstream of pulses, or a plurality of private downstreams and upstreams of pulses.

The PSTN is a circuit switched network, which is normally accessed by telephones, key telephone systems, private branch exchange trunks, and data arrangements. The circuit between the call originator and call receiver in a PSTN is completed using network signaling in the form of dial pulses or multi-frequency tones. Even though long distance carriers generally operate fiber optic networks, the Local Exchange Carriers (LEC) and Competitive Local Exchange Carriers (CLEC) are the primary "last mile" link, which is generally telephone twisted pair, to the home, or business.

Figure 17:
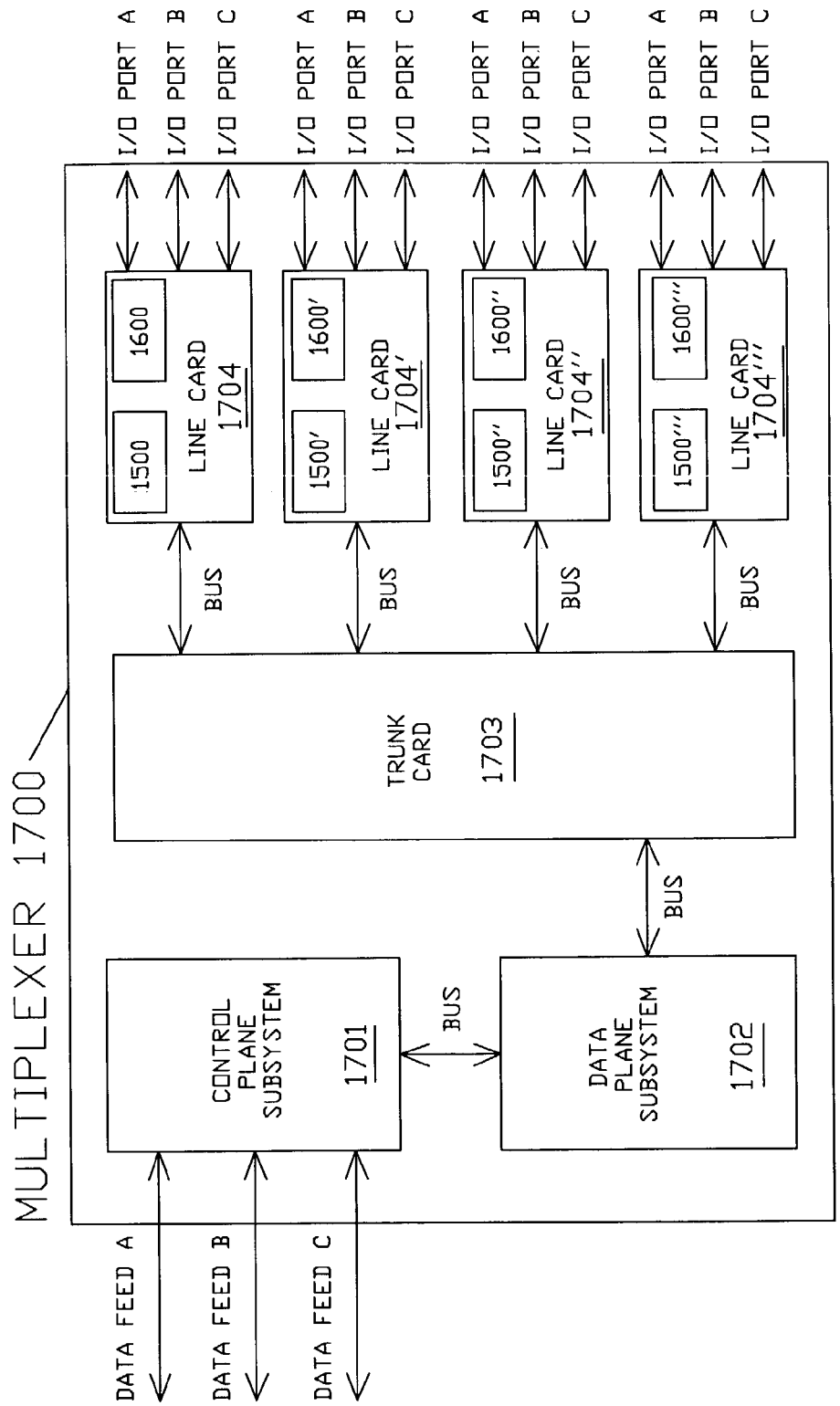
FIG. 17 is a block diagram of a multiplexer according to one embodiment of the present invention.

The preferred embodiment of the present invention as shown in FIG. 3 is a typical LEC PSTN network topology configured without any intermediate field electronics, and with the addition of a multiplexer 1700, which may also be referred to as a UWB unit or telecommunications interface and is shown in FIG. 17. The tandem office 305 is the toll administration office that connects the LEC, via transmission medium 300, which may be fiber optic cable, a wireless system, etc., to other LECs through long distance Interchange Carriers (IXC), Internet Service Providers (ISP), Application Service Providers (ASP), to peering points, such as, but not limited to another computer, a server farm, and data reverberating over a network. The tandem office 305 is connected to one or more Central Offices (CO) 310 via the underground plant 315. The underground plant 315 usually consists of transport medium, such as, but not limited to, fiber optic lines for the transport of multiplexed, digital data streams.

CO 310 is the switching center for the LEC. The CO 310 is the co-location point for any DSL equipment the LEC is operating, such as, but not limited to a Digital Subscriber Lines Access Multiplexer (DSLAM), etc. The DSLAM 311 generates, modulates, transmits, and receives DSL signals to and from the Main Distribution Frame (MDF) 314. The CO 310 also houses the switching gear 313 for completing circuits between two, or more customers, and the MDF 314, which is the main termination block for all of a LEC's telephone twisted pairs. The CO 310, will also be the co-location point for the present invention's multiplexer 1700. This equipment generates, modulates, transmits, and receives signals to and from the MDF 314.

MDF 314 is connected to the end-user via feeder distribution network 335, which are telephone twisted pairs grouped together in binders of 25 or 50, Junctor Wire Interface Cabinets (JWIC) 340, and pedestal(s) 350. JWIC 340 is a mechanical cross-connect cabinet that connects the telephone twisted pairs coming from MDF 314 to the various pedestals 350, via feeder distribution network 335 in a LEC's network.

Pedestal 350 is a junction box where customer drops 355 are terminated in a neighborhood. Customer drops 355 are telephone twisted pairs from the pedestal 350 to the interface device 361, which can be located inside, or outside a customer's building 360. Interface device 361 can be equipment, such as, but not limited to, a codec 1800 shown in FIG. 18.

The LEC described in FIG. 3 will continue to operate normal voice, media, and data services over their network. Local voice traffic will continue to be switched, and packets of media and data will be handled with existing, or future systems and protocols such as, but not limited to, Integrated Services Digital Network (ISDN), DSL, Asynchronous Transfer Mode (ATM), analog codec, Transmission Control Protocol/Internet Protocol (TCP/IP), etc. The present invention provides a protocol and system agnostic carrier that can be enabled to carry any form of digital voice, media, and data transmissions, such as, but not limited to, TCP/IP packets, ATM frames, etc. A specific protocol is being developed for the commercial deployment of this system known as the Lightwaves Data Link protocol (LDL), and is described in detail later in this document. The multiplexer 1700 in the CO 310 will generate pulse transmissions at, or below the noise level, of the LEC's network.

Once inside building 360, high data rate Home PNA-type systems can be built using pulses transmitted over telephone twisted pairs or electrical wiring.

In order to achieve longer transmission distances at lower data rates from the CO 310, over-sampling techniques such as, Cyclic Redundancy Code (CRC), and Forward Error Correction (FEC), etc., can be used to insure an acceptable Bit Error Rate (BER).

FIG. 4 illustrates an alternate embodiment of the present invention is configured as a Public Switched Telephone Network (PSTN) topology which includes intermediate field electronics in the form a Digital Loop Carrier (DLC) cabinet 400. This network topology of the present invention may operate a single private multiplexed downstream and upstream of pulses, or a plurality of private downstreams and upstreams of pulses. The pulses are high number base encoded, and are near, or in the noise range of the transmission on a network, which may be running voice, video, and data traffic by means other than the pulses of the present invention.

The PSTN is a circuit switched network, which is normally accessed by telephones, key telephone systems, private branch exchange trunks, and data arrangements. The circuit between the call originator and call receiver in a PSTN is completed using network signaling in the form of dial pulses or multi-frequency tones. Even though long distance carriers generally operate fiber optic networks, the Local Exchange Carriers (LEC) and Competitive Local Exchange Carriers (CLEC) are the primary "last mile" link, which is generally telephone twisted pair, to the home, or business.

This alternate embodiment of the present invention is a typical LEC, as shown in FIG. 4, with the addition of an multiplexer 1700. The tandem office 305 is the toll administration office that connects the LEC, via transmission medium 300, which may be fiber optic cable, a wireless system, etc., to other LECs through long distance Interchange Carriers (IXC), Internet Service Providers (ISP), Application Service Providers (ASP), to peering points, such as, but not limited to another computer, a server farm, and data reverberating over a network. The tandem office 305 is connected to one or more Central Offices (CO) 310 via the underground plant 315. The underground plant 315 usually consists of transport medium, such as, but not limited to, fiber optic lines for the transport of multiplexed, digital data streams.

CO 310 is the switching center for the LEC. The CO 310 is a co-location point for any DSL equipment the LEC is operating, such as, but not limited to a Digital Subscriber Lines Access Multiplexer (DSLAM), etc. The DSLAM 311 generates, modulates, transmits, and receives DSL signals to and from the Main Distribution Frame (MDF) 314. CO 310 also houses the switching gear 313 for completing circuits between two, or more customers, and the MDF 314, which is the main termination block for all of a LEC's telephone twisted pairs. This equipment generates, modulates, transmits, and receives signals to and from the MDF 314.

The MDF 314 sends and receives multiplexed, digital data streams to and from the DLC 400 via the underground plant 315. The Digital Loop Carrier (DLC) 400 are connected to an end-user via feeder distribution network 335, which are telephone twisted pairs grouped together in binders of 25 or 50, Junctor Wire Interface Cabinets (JWIC) 340, and pedestal(s) 350. DLC 400 is a piece of intermediate field electronics used to increase the physical reach of a CO. DLC 400 is an analog to digital converter, and multiplexer for traffic coming from a customer's building 360 back to the CO 310. In this embodiment of the present invention, the DLC 400, serves as the co-location point for the present invention's multiplexer 1700. JWIC 340 is a mechanical cross-connect cabinet that connects the telephone twisted pairs coming from DLC 400 to the various pedestals 350, via feeder distribution network 335 in a LEC's network.

Pedestal 350 is a junction box where customer drops 355 are terminated in a neighborhood. Customer drops 355 are telephone twisted pairs from the pedestal 350 to the interface device 361, which can be located inside, or outside a customer's building 360. Interface device 361 can be equipment, such as, but not limited to, a codec 1800 shown in FIG. 18.

The LEC described in FIG. 4 will continue to operate normal voice, media, and data services over their network. Local voice traffic will continue to be switched, and packets of media and data will be handled with existing, or future systems and protocols such as, but not limited to, Integrated Services Digital Network (ISDN), DSL, Asynchronous Transfer Mode (ATM), analog codec, Transmission Control Protocol/Internet Protocol (TCP/IP), etc. Protocol and system agnostic carrier of the present invention can be enabled to carry any form of digital voice, media, and data transmissions, such as, but not limited to, TCP/IP packets, ATM frames, etc. A specific protocol is being developed for the commercial deployment of this system known as the Lightwaves Data Link protocol (LDL), and is described in detail later in this document. The multiplexer 1700 in the DLC 400 will generate transmissions at, or below the noise level, of the LEC's network.

Once inside building 360, high data rate Home PNA-type systems can be built using pulses transmitted over telephone twisted pairs or electrical wiring.

In order to achieve longer transmission distances as lower data rates from the DLC 400, over-sampling techniques such as, Cyclic Redundancy Code (CRC), and Forward Error Correction (FEC), etc., can be used to insure an acceptable Bit Error Rate (BER).

Figure 18:
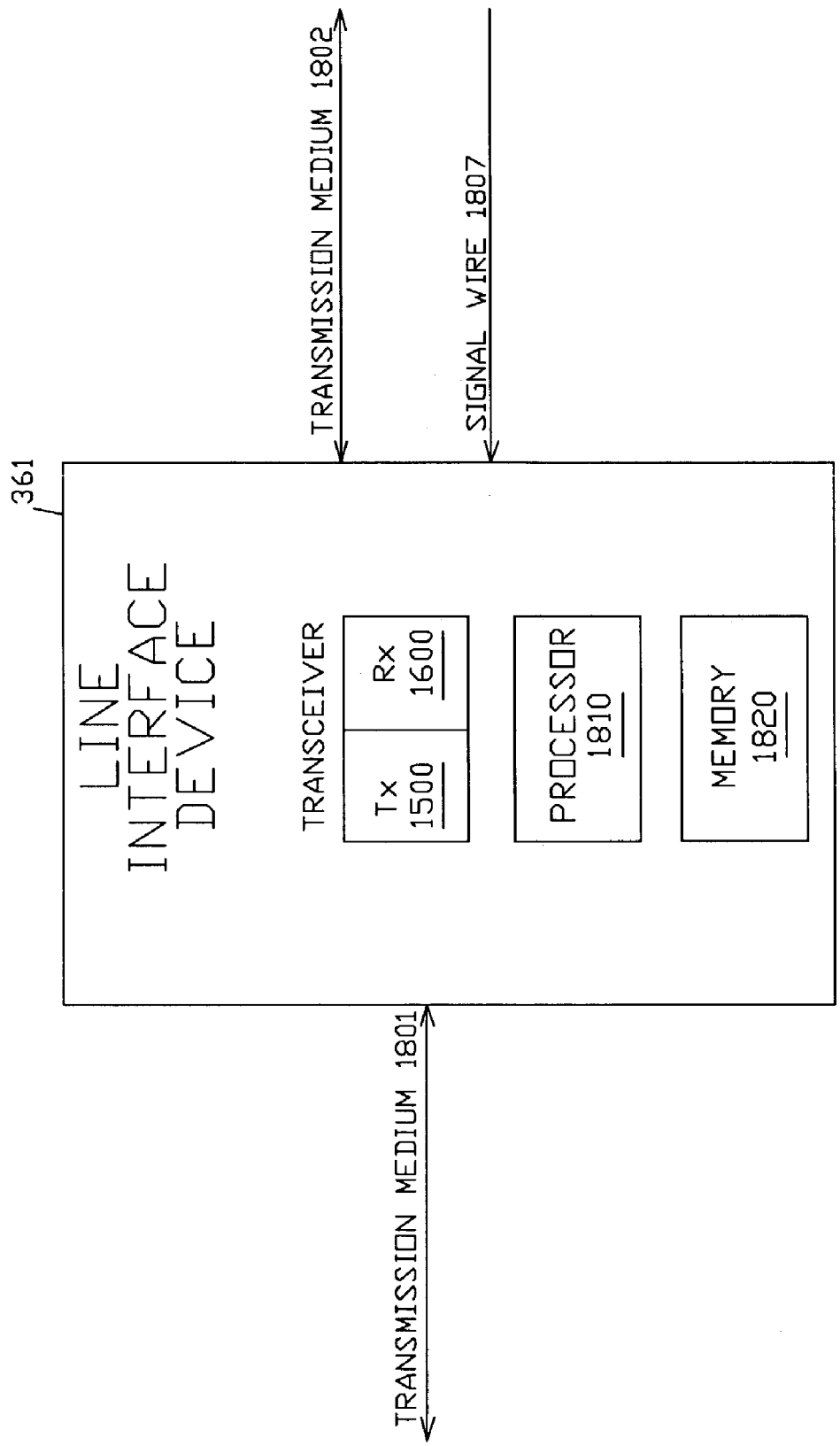
FIG. 18 is a block diagram of a codec according to one embodiment of the present invention.

The following is an example of retrieving an Internet web page using the preferred embodiment of the present invention as shown in FIG. 3, or the alternate embodiment of the present invention as shown in FIG. 4. A user with service over their LEC's switched network wishes to use their PC to access a web page from a remote server. The client device, such as, but not limited to a PC, is connected, either internally or externally to a stand-alone codec 1800, as shown in FIG. 18, or integrated into a device. Codec 1800 is shown in FIG. 18, and in one embodiment can be a UWB modem.

The PC uses Internet browser software, such as, but not limited to Microsoft Internet Explorer 6.0, in order to initiate the following steps that would generally be required to connect to the remote server using a standard client-server architecture, using a codec 1800, as shown in FIG. 18, for access to the Internet over a LEC's switched network, through an Internet Service Provider (ISP) in order to retrieve the following file: http://www.dlblimited.com/aboutDLB.htm The browser breaks the Uniform Resource Locator (URL) into 3 parts:
The communication protocol to be used: Hyper Text Transfer Protocol (HTTP)
The server name to be accessed: (www.dlblimited.com)
The requested file: (aboutDLB.htm)
The PC's communication software creates a data packet using TCP/IP stack protocol
The PC's communication software encapsulates the TCP/IP data packet in Point-to-Point Protocol (PPP), which is an established standard for the assignment and management of IP addresses, asynchronous (start/stop) and bit-oriented synchronous encapsulation, network protocol multiplexing, link configuration, link quality testing, error detection, and option negotiation for such capabilities as network layer address negotiation and data-compression negotiation.
The PC sends the TCP/IP data packet encapsulated in PPP to a codec 1800, as shown in FIG. 18, which is a full-duplex device, in order to transmit and receive digital information over twisted telephone pairs.
The PC can be transmit TCP/IP data packets over a plurality of methods to the codec 1800, as shown in FIG. 18, including but not limited to local and external buses such as Peripheral Component Interconnect (PCI), Advanced TCA, Industry Standard Architecture (ISA), Ethernet, Infiniband, Universal Serial Bus (USB), serial or parallel, 802.11 wireless, Bluetooth, etc. The codec 1800, as shown in FIG. 18 may be stand alone or integrated into another device.

The codec 1800, as shown in FIG. 18, converts the byte information contained in the data packet into time delays for pulses, modulates the pulses in a manner that is compatible with the LEC's telephone twisted pair, and serially transmits signal pulses over the LEC's switched network as a PN coded noise-like signals.

The CO 310 or DLC 400 houses a multiplexer 1700 that converts the PN coded noise-like signals containing data resulting from typical Internet usage back into bytes, the bytes into individual bits, then modulates and signals the bits onto the packet network for routing to a user's ISP. Typical Internet usage data includes, but is not limited to domain name resolutions on Domain Name Servers (DNS), transmission of browser cookies, transmission of client environment information like browser-type and version, HTTP requests such as "get and post" operations, FTP requests, Telnet requests, Post-Office Protocol (POP3) E-mail requests, etc.

The process is reversed at the LEC's central office when requests such as HTTP, FTP, Telnet, POP3 are fulfilled and responded with data packet(s) containing the requested information in a variety of formats including, but not limited to files, streams, Hyper Text Markup Language (HTML), Graphics Interchange Format (GIF), Joint Photographic Experts Group (JPEG), American Standard Code for Information Interchange (ASCII), Tag Image File Format (TIFF), Portable Document Format (PDF), Motion Pictures Expert Group (MPEG), MPEG 1 Audio Layer 3 (MP3), binary, etc.

The CO's 310 or DLC's 400 multiplexer 1700 converts the data packet bytes into time delays for pulses, and serially transmits signal pulses over the LEC's switched network as pseudo-random coded noise to the original web page requester.

The requester's codec demodulates the pulses, converts pulses to bytes and subsequently bits, to be forwarded to the PC by modulating them over the network or bus as described above.

The PC's browser processes the HTML tags and formats the web page for display on the PC's monitor. The PC browser may invoke a plurality of "plugins" to provide additional functionality and to display data formats other than HTML. For example, Adobe Acrobat to display PDF files or Windows Media Player for MPEG and MP3 files and streams.

This entire process may be repeated several times in order to retrieve a single web page, or transmit other types of digital data at high speeds, such as, but not limited to, voice, music, video, software, communicate with an Application Service Provider (ASP), video conferencing, etc.

Figure 5:
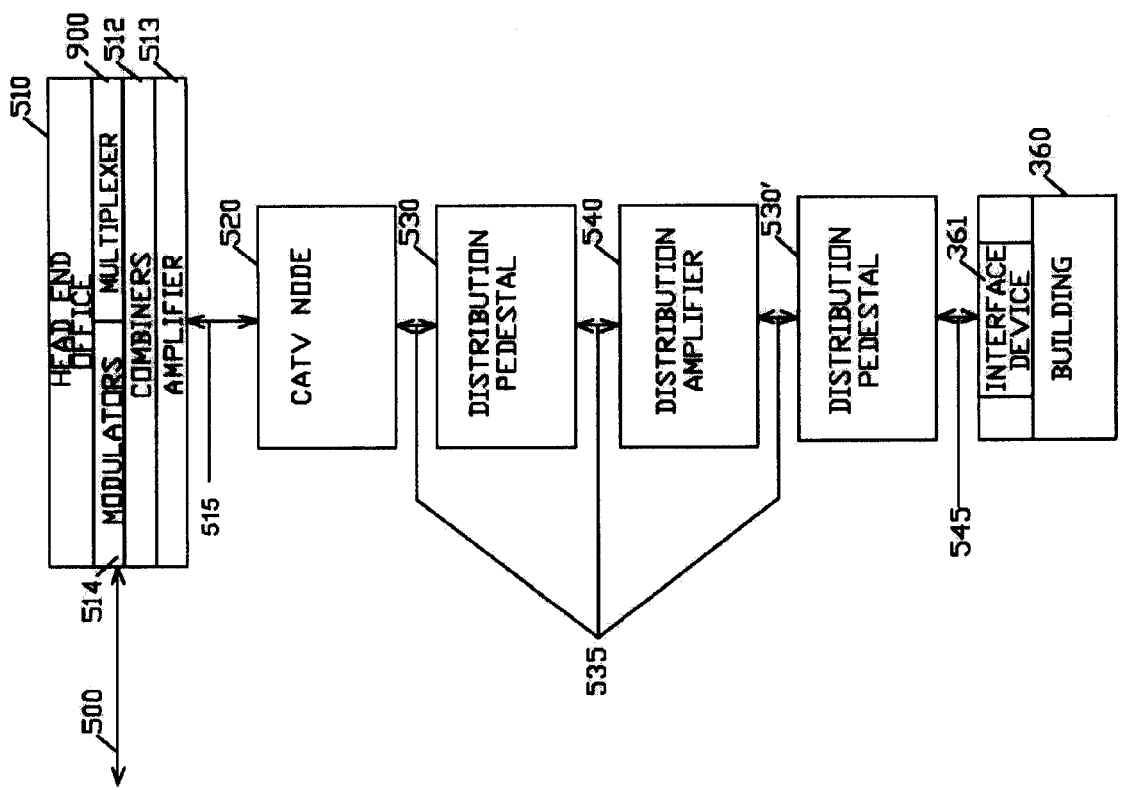
FIG. 5 is an illustration of a CATV network topology configured in accordance with an alternate embodiment of the present invention.

FIG. 5 illustrates an alternate embodiment of the present invention, and is a Cable Television network (CATV), which may operate a single, or a plurality of shared multiplexed downstreams and upstreams of pulses. The pulses are high number base encoded, and are near, or in the noise range of the transmission on a network, which may be running voice, video, and data traffic by means other than the pulse transmissions of the present invention.

Cable television networks are generally categorized by their overall bandwidth, which equates to the total number of channels they can transmit. Older systems are designated as 330 MHz and 550 MHz. Newer systems are designated as 750 MHz, 860 MHz, and 1 GHz. CATV networks use coaxial, and/or fiber optic cable to distribute video, audio, and data signals to homes or other establishments that subscribe to the service. Systems with bi-directional capability can also transmit signals from various points within the cable network to a central originating point.

CATV distribution systems typically use leased space on utility poles owned by a telephone or power distribution company. In areas with underground utilities, CATV systems are normally installed either in conduits, or buried directly, depending on local building codes and soil conditions.

An alternate embodiment of the present invention is a typical CATV all-coax network, as shown in FIG. 5, with the addition of a multiplexer 1700. The Head End Office 510 is the central originating point of all signals carried throughout the CATV network that connects the CATV network to programming via transmission medium 400, which may be fiber optic cable, and/or a wireless system, such as, but not limited to satellites, and/or media servers, etc. Transmission medium 400 may also be used to connect to data sources for cable codec customers through an Internet Service Provider (ISP), Application Service Provider (ASP), to peering points, such as, but not limited to another computer, a server farm, and data reverberating.

Head End Office 510 is the multiplexing and switching center for the CATV network. The Head End Office 510 can also be a co-location point for an ISP. The Head End Office 510 houses modulators 514 to receive input baseband signals from transmission medium 500, and generate a high-quality vestigial sideband TV signal for output to a combiner 512. Combiners 512 are used to combine several signals into a single output with a high degree of isolation between inputs. The Head End Office 510, will also be the co-location point for the present invention's multiplexer 1700. This equipment generates, modulates, transmits, and receives data signals from a customer, switched networks, such as but not limited to the PSTN, and data packet networks, such as, but not limited to the Internet. The signals from the combiners 512 are fed to an amplifier 513 that is a low noise, high gain amplifier that also stabilizes the level of VHF and UHF channel output signals.

The amplifier 513 sends and receives multiplexed, analog and/or digital data streams to and from the distribution network. CATV networks are specialized systems for transmitting numerous television channels in a sealed spectrum, rather than a general-purpose communications medium, so the topology of the network is designed for maximum distribution efficiency, and is called a tree-and-branch architecture. Signals from the Head End Office 510 are routed over transmission medium 515, which is coaxial cable to CATV node 520. CATV node 520 is a main distribution point in a CATV network to the various branches that serve smaller geographical areas. The CATV node 520 relays signals via a serial distribution system of distribution pedestals 530, 530', distribution amplifiers 540, to a customer's drop 545, via feeder distribution network 535. The present invention is also applicable to CATV networks configured in a ring topology.

The customer's drop 545 is connected to a interface device 361, which can be equipment, such as, but not limited to, a CATV splitter, from which coaxial cable in building 360 may terminate directly into the television receiver on 12-channel systems, or into a converter where more than 12 channels are provided. Most modern receivers and video-cassette recorders are "cable-ready" and include the necessary converters to access the additional system channels.

Systems providing pay services may require a descrambler, or other form of converter, in the subscriber's home to allow the viewer to receive these special services. Newer cable systems use addressable converters or descramblers, giving the cable operator control over the channels received by subscribers. This control enables services such as per-view pay without the need for a technician to visit the home, or business, to install the special service. In addition, the customer drop 445 may terminate at an interface device 361 with an integrated codec 1800, as shown in FIG. 18.

The CATV network described in FIG. 5 will continue to provide their normal media and data services over their network. In addition, the multiplexer 1700 in the Head End Office 510 will generate transmissions over the CATV network operating near, or in the noise level in order to create bandwidth.

In addition, once inside building 360, high data rate Home PNA-type systems can be built using the pulse transmissions of the present invention over telephone twisted pairs or electrical wiring The following is an example of retrieving an Internet web page using the CATV embodiment of the present invention as shown in FIG. 5 A user with the service of the present invention over their CATV provider's network wishes to use their PC to access a web page from a remote server. The client device, such as, but not limited to a PC, is connected, either internally or externally to a stand-alone codec 1800, as shown in FIG. 18, or integrated into a device.

The PC uses Internet browser software, such as, but not limited to Microsoft Internet Explorer 6.0, in order to initiate the following steps that would generally be required to connect to the remote server using a standard client-server architecture, using a codec 1800, as shown in FIG. 18, for access to the Internet over a CATV network, through an Internet Service Provider (ISP) in order to retrieve the following file: http://www.dlblimited.com/aboutDLB.htm The browser breaks the Uniform Resource Locator (URL) into 3 parts:
The communication protocol to be used: Hyper Text Transfer Protocol (HTTP)
The server name to be accessed: (www.dlblimited.com)
The requested file: (aboutDLB.htm)
The PC's communication software creates a data packet using TCP/IP stack protocol
The PC's communication software encapsulates the TCP/IP data packet in Point-to-Point Protocol (PPP), which is an established standard for the assignment and management of IP addresses, asynchronous (start/stop) and bit-oriented synchronous encapsulation, network protocol multiplexing, link configuration, link quality testing, error detection, and option negotiation for such capabilities as network layer address negotiation and data-compression negotiation.
The PC sends the TCP/IP data packet encapsulated in PPP to a codec 1800, as shown in FIG. 18, which is a full-duplex device, in order to transmit and receive digital information over twisted telephone pairs.
The PC can be transmit TCP/IP data packets over a plurality of methods to the codec 1800, as shown in FIG. 18, including but not limited to local and external buses such as Peripheral Component Interconnect (PCI), Advanced TCA, Industry Standard Architecture (ISA), Ethernet, Infiniband, Universal Serial Bus (USB), serial or parallel, 802.11 wireless, Bluetooth, etc. The codec 1800, as shown in FIG. 18 may be stand alone or integrated into another device.
The codec 1800, as shown in FIG. 18, converts the byte information contained in the data packet into time delays for pulses, modulates the pulses in a manner that is compatible with the CATV provider's coaxial cable, and serially transmits signal pulses over the CATV provider's network as a PN coded noise-like signals.
The Head End office 510 houses a multiplexer 1700 that converts the PN coded noise-like signals containing data resulting from typical Internet usage back into bytes, the bytes into individual bits, then modulates and signals the bits onto the packet network for routing to a user's ISP. Typical Internet usage data includes, but is not limited to domain name resolutions on Domain Name Servers (DNS), transmission of browser cookies, transmission of client environment information like browser-type and version, HTTP requests such as "get and post" operations, FTP requests, Telnet requests, Post-Office Protocol (POP3) E-mail requests, etc.
The process is reversed at the CATV Head End office 510 when requests such as HTTP, FTP, Telnet, POP3 are fulfilled and responded with data packet(s) containing the requested information in a variety of formats including, but not limited to files, streams, Hyper Text Markup Language (HTML), Graphics Interchange Format (GIF), Joint Photographic Experts Group (JPEG), American Standard Code for Information Interchange (ASCII), Tag Image File Format (TIFF), Portable Document Format (PDF), Motion Pictures Expert Group (MPEG), MPEG 1 Audio Layer 3 (MP3), binary, etc.
The Head End office's 510 multiplexer 1700 converts the data packet bytes into time delays for pulses, and serially transmits signal pulses over the CATV provider's network as pseudo-random coded noise to the original web page requester.
The requester's codec demodulates the pulses, converts pulses to bytes and subsequently bits, to be forwarded to the PC by modulating them over the network or bus as described above.
The PC's browser processes the HTML tags and formats the web page for display on the PC's monitor. The PC browser may invoke a plurality of "plugins" to provide additional functionality and to display data formats other than HTML. For example, Adobe Acrobat to display PDF files or Windows Media Player for MPEG and MP3 files and streams.

This entire process may be repeated several times in order to retrieve a single web page, or transmit other types of digital data at high speeds, such as, but not limited to, voice, music, video, software, communicate with an Application Service Provider (ASP), video conferencing, etc.

Figure 6:
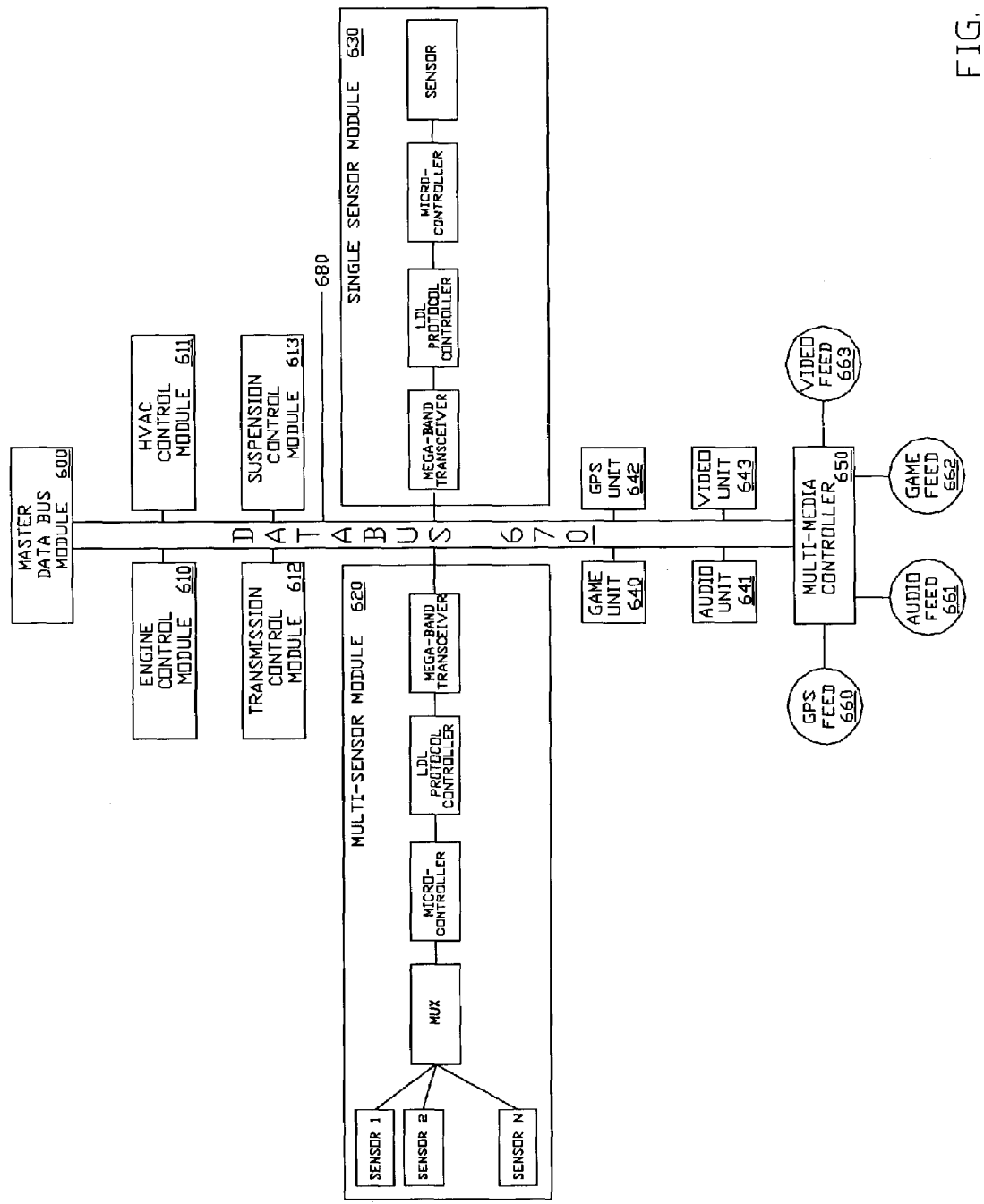
FIG. 6 is a block diagram of a data bus network topology configured in accordance with an alternate embodiment of the present invention.

FIG. 6 illustrates an embodiment of the present invention used as high speed data bus for use in an automobile for example. The inventors have tested the transmission and reception of the present invention's pulsed signals over the metallic portions of a pick-up truck.

The data bus network may operate a single, or a plurality of shared multiplexed downstreams and upstreams of present invention's pulses. The pulses are high number base encoded, and are near, or in the noise range of the data bus network, which may be running voice, video, and data traffic by means other than the present invention.

The data bus network as illustrated in FIG. 6 is comprised of various components connected to data bus 670, which is a guided media. These components include a master data bus module 600 which control various electronic control modules which are well known in the art, including, but not limited to, engine control module 610, HVAC control module 611, transmission control module 612, and suspension control module 613. In addition, master data bus module 600 controls various sensors connected to the data bus network via data bus 670, including a multi-sensor module 620, and a single sensor module 630 connected to the data bus network. Only one of each type of sensor module is shown for clarity, but in reality there can be as many as 50 sensors on a current model year vehicle. Also connected to the data bus network is a multi-media controller 650 which manages various feeds including, but not limited to a GPS feed 660, audio feed 661, game feed 662, and video feed 663, which are distributed to a game unit 640, audio unit 641, GPS unit 642, and a video unit 643 via the data bus 670.

Figure 15:
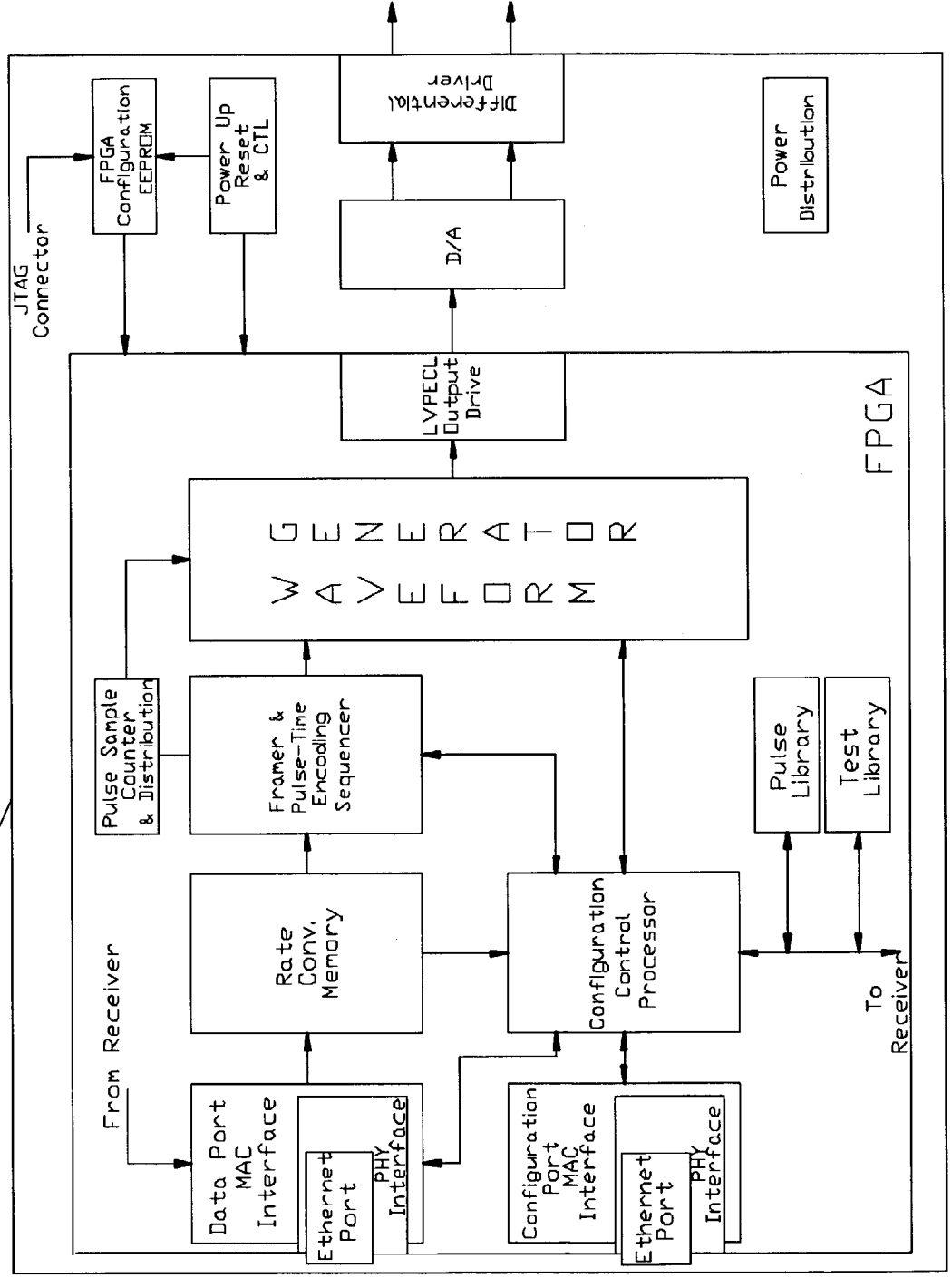
FIG. 15 is a block diagram of a transmitter according to one embodiment of the present invention.
Figure 16:
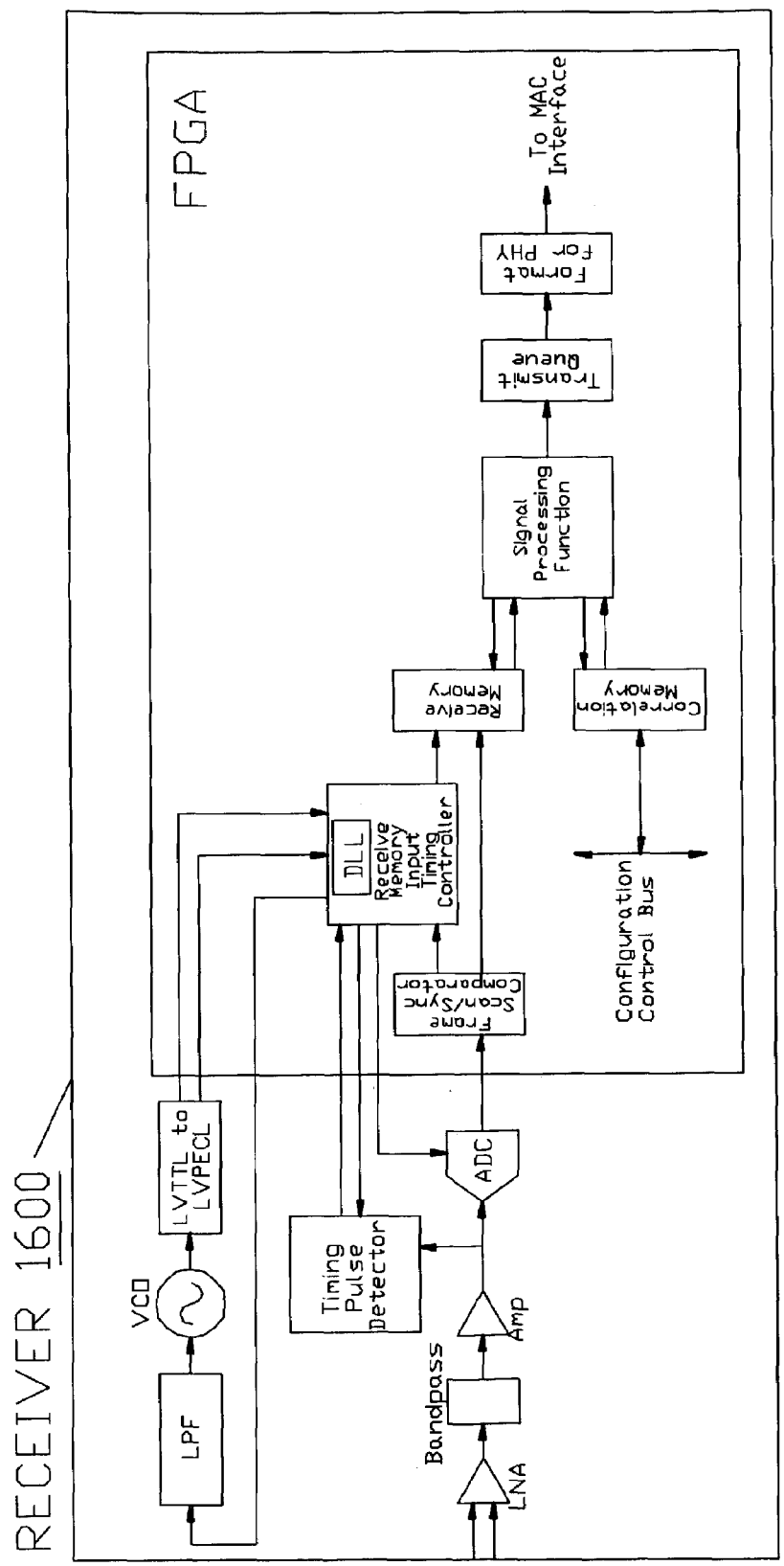
FIG. 16 is a block diagram of a receiver according to one embodiment of the present invention.

The master data bus module 600, engine control module 610, HVAC control module 611, transmission control module 612, suspension control module 613, multi-sensor module 620, single sensor module 630, game unit 640, audio unit 641, GPS unit 642, video unit 643, and multi-media controller 650 are equipped with the present invention's transmitter and receivers as shown in FIGS. 15 and 16.

Data bus 670 is shown as two conductors, but may be a single conductor. Data bus 670 can be a conductor such as a power wire, a shielded or unshielded wire, etc.

Master data base module 600 and multi-media controller 650 are the multiplexing and switching components of the data bus network.

Alternatively, the data bus network can be operated as an Ethernet.

The data bus network is protocol agnostic and use any protocol including, but not limited to, the Intelligent Transportation System Data Bus (ITSDB), and MIL-STD-1553 for military vehicles, aircraft, missiles, rockets etc. In addition, these protocols can be encapsulated in the LDL protocol described in the present invention.

In an alternative embodiment of a data bus network in an automobile, the sensors could be powered up by wireless radio frequency energy, similar to passive Radio Frequency Identification (RFID) technology, and connected to a data bus 670 which is the metallic portions of a vehicle, including the body, frame, engine, etc. In this embodiment, expensive wiring for power and signaling could be reduced, or eliminated.

Although a data bus network in an automobile or other vehicle is illustrated in FIG. 6, one skilled in the art will recognize that data bus networks for an application such as a SCADA (Supervisory Control and Data Acquisition) application, such as, but limited to Controller Are Network Bus (CAN). In these embodiments the data bus 670 could be unique guided mediums such as, but not limited to, structural steel in a building, or the drill stem in a drilling rig application, etc.

Lightwaves Data Link (LDL) Protocol

The present invention is transport protocol agnostic. The system may be configured to use standardized or proprietary transport protocols. Standardized network and transport protocols include, but are not limited to, Ethernet, Asynchronous Transport Mode (ATM), Synchronous Optical Network (SONET), IP-based protocols such as File Transfer Protocols (FTP), Transmission Control Protocol (TCP), Hyper-text Transport Protocol (HTTP), Internetwork Packet Exchange (IPX), Motion Picture Expert Group (MPEG), MPEG-1 Audio 3 (MP3) and System Network Architecture (SNA).

Lightwaves Data Link (LDL) is a proprietary data packet architecture designed for use in the present invention's preferred embodiment on telephone twisted pair networks, particularly considering the impact of high bandwidth/user becoming available. The LDL protocol has been designed to be easily adaptable to other embodiments of the present invention including, but not limited to, CATV, LAN, and Data Bus. Additionally, LDL could be used with other standardized or proprietary data transport systems and methods.

LDL is based upon Lucent's Simple Data Link Protocol (SDL) and IETF's RFC 2823 titled "PPP over Simple Data Link using SONET/SDH with ATM-like Framing." LDL encapsulates protocol data units (PDUs), such as Internet Protocol (IP), Internetwork Packet Exchange (IPX), etc. for transport using the present invention's data transmission system. LDL uses some of the same constructs provided in SDL. The LDL frames are illustrated in Charts 6 through 9 below.

CHART 6

LDL IDLE FRAME

| LDL Header | |
|---|---|
| LDL Payload Data Length<br>2 octets | Payload Length CRC<br>2 octets |

CHART 7

LDL LINK LAYER SCRAMBLER FRAME

| LDL Header | | | | |
|---|---|---|---|---|
| LDL | | LDL Private Area | | |
| Payload<br>Data<br>Length | Payload<br>Length CRC | LDL Priority,<br>Type, Broadcast,<br>Stream ID | Stream<br>Count | LDL Cheek<br>Private & Payload<br>CRC 16 |
| 2 octets | 2 octets | 3 octets | 1 Octet | 2 octets |

CHART 8

LDL OPERATION AND MEASUREMENTS MESSAGE FRAME

| LDL Header | | | | |
|---|---|---|---|---|
| LDL | | LDL Private Area | | |
| Payload<br>Data<br>Length | Payload<br>Length CRC | LDL Priority,<br>Type, Broadcast,<br>Stream ID | Stream<br>Count | LDL Check<br>Private & Payload<br>CRC 16 |
| 2 octets | 2 octet | 3 octets | 1 Octet | 2 octets |

CHART 9

LDL PDU TRANSPORT FRAME

| | | LDL Private Area | | | |
|---|---|---|---|---|---|
| LDL Header | LDL | | | | |
| LDL<br>Payload<br>Data<br>Length | Payload<br>Length<br>CRC | Priority,<br>Type,<br>Broadcast,<br>Stream ID | Stream<br>Count | LDL Payload<br>LDL Payload<br>Data Area | LDL Check<br>Private &<br>Payload CRC<br>32 |
| 2 octets | 2 octet | 3 octets | 1 Octet | <=65,535<br>octets | 4 octets |

The LDL header contains two fields and when used together function as the frame delimiter for LDL. Every LDL frame transmitted requires a complete LDL Header containing the LDL Payload Data Length (PDL) and the LDL Payload Length CRC fields.

The LDL Payload Data Length contains the number of octets contained within the LDL Payload Data Area. Its value dictates the type of LDL frame transmitted. As examples:

Idle (PDL=0): LDL Private and Payload Areas are not transmitted, thus a LDL check is also not required. Only the LDL Header is transmitted as a group of four NULL octets.

Link Layer Scramble (PDL=1): The LDL Payload area is not transmitted. As a result, an LDL Check field of 2 octets contains the checksum of the LDL Private Area.

Operations and Measurement (OAM) Message Frames (PDL=2 or 3): The LDL Private area of 4 octets contains OAM data. The LDL Payload area is not transmitted. As a result, an LDL Check field of 2 octets contains the checksum of the LDL Private Area.

Protocol Data Unit (PDU) Transport Frame (4<PDL<=65,535): This LDL frame is used for encapsulating raw PDUs for transport between multiple LDL devices. The LDL Private and Payload areas are transmitted and the LDL Check contains a 4 octet CRC calculated over the LDL Private and Payload areas.

The Payload Length CRC contains the CRC-16 or CRC-32 calculation of the LDL Payload Length contained in the LDL Payload Data Length.

The LDL Private Area consists of 4 octets divided into 3 octets described in Chart 9 for the LDL frame priority, the frame type, broadcast type and stream ID. With the exception of an LDL Idle Frame, every LDL Frame requires a LDL Private area consisting of 6 octets in length.

The LDL Payload Area contains the encapsulated PDUs to be transmitted between multiple LDL devices. When an LDL frame contains a payload, the LDL Payload Area ranges from a minimum of 4 to a maximum of 65,535 octets in size.

Cycle Redundancy Check (CRC) 16 and 32 bit is an algorithm based upon the use of polynomial arithmetic that assigns a CRC value equal to the remainder of dividing the LDL Private and Payload Data Areas (if used) by a divisor representing a polynomial. It can process any payload of any size, so the length of the payload in combination with the LDL private area is not an issue. LDL idle frames do not contain a CRC and the size of the CRC field is dependent on the type of the LDL frame used.

Figure 7:
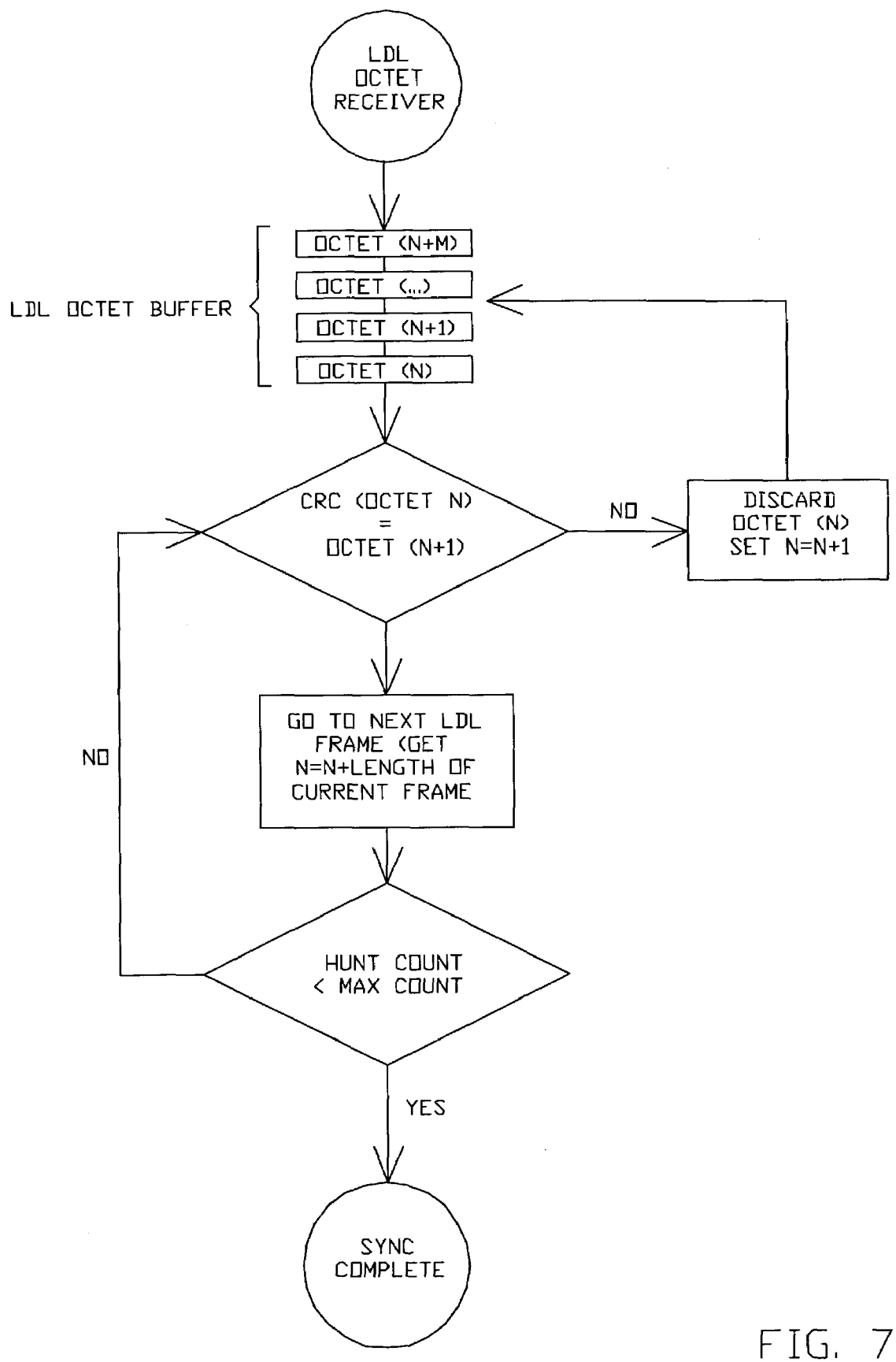
FIG. 7 is a flow chart that illustrates the LDL protocol's hunt and synchronization method.

An LDL session begins with the hunting and synchronization process. FIG. 7 is a flow chart of the process.

LDL octets are received into an octet buffer or other memory and storage caching mechanism that is subsequently processed by the LDL decoder. The hunt begins at the beginning of the octet buffer and compares CRC-16 value of the current octet and value of the next octet. If there is no match, then the current octet is discarded and the process moves to the next octet in the buffer.

If there is a match between these two values, then it is known with a high degree of probability that a valid LDL length octet has been found. Using the assumption this is the actual length, a calculation is performed to determine the location of the next LDL frame's length and CRC-16 value octets, in order to perform the comparison again for the subsequent frame. If the comparison is also successful, then it is assumed synchronization has been achieved for the LDL frame stream.

Prior art has noted that some transmission methods encounter difficulty in transmitting lengthy successions of identical data values, and as a result methods of scrambling data have been developed. Scrambling data to be transported over a network increases the density of shifts from binary value "1" to "0" and vice-versa in any given stream of data. Scrambling is accomplished by coupling data streams with scrambling patterns to produce data patterns that contain enough shifting to reduce transmission problems. Due to the nature of the physical transport of the present invention, there may be a limited need, if any, to implement scrambling within LDL in preparation for the transmission of data over.

Network PDU frames define network elements encapsulated within LDL and transported between devices capable of using the LDL protocol. Charts 10 through 13 define PDU frame outlines for Network PDU types, such as, but not limited to, Ethernet and MPEG, that can be contained within the LDL Data area for transport.

CHART 10

| | | | | | | | |
|---|---|---|---|---|---|---|---|
| | | | ETHERNET 802.3 | | | | |
| Preamble | Start Frame Delimiter | Dest. MAC Address | Source MAC Address | Length/Type | MAC Client Data | Pad | Frame Check Sequence |
| 7 octets | 1 octet | 6 octets | 6 octets | 2 octets | <=1.5 K | | 4 octets |

The Ethernet 802.3 minimum frame size is 64 octets, and the maximum frame size is 1518 octets. It should be noted Ethernet standards do not include the preamble or start frame delimiter as part of frame length.

CHART 11

| | | | | | | | | | |
|---|---|---|---|---|---|---|---|---|---|
| | | | ETHERNET VIRTUAL LOCAL AREA NETWORK (VLAN) 802.3ac | | | | | | |
| Preamble | Start Frame Delimiter | Dest. MAC Address | Source MAC Address | 802.1 Q Tag Type | Tag Control Info | Length/ Type | MAC Client Data | Pad | Frame Check Sequence |
| 7 octets | 1 octet | 6 octets | 6 octets | 2 octets | 2 octets | 2 octets | <=1.5 K | | 4 octets |

The minimum Ethernet Virtual Local Area Network (VLAN) 802.ac frame size is 64 octets, and the maximum frame size is 1522 octets. It should also be noted that some references to length for Ethernet do not include the preamble or start frame delimiter.

CHART 12

Gigabit Ethernet 802.3z

| Preamble | Start Frame Delimiter | Dest. MAC Address | Source MAC Address | Length/Type | MAC Client Data | Pad | Frame Check Sequence | Extension |
|---|---|---|---|---|---|---|---|---|
| 7 octets | 1 octet | 6 octets | 6 octets | 2 octets | <=1.5 K | | 4 octets | |

The frame size for Gigabit Ethernet 802.3z remains the same Ethernet 802.3 with the exception that the length from the Destination MAC Address field through the Extension field is a minimum of 512 octets.

The following chart defines the structure for an MPEG Transport PDU.

CHART 13

MPEG Transport PDU

| Header | Payload |
|---|---|
| >= 4 octets | <188 octets - header size |

In the future, the LDL protocol is designed to be flexible enough to handle Ethernet Jumbo frames that have a maximum size of 9,000 octets.

Since LDL is built upon the constructs of SDL, an LDL frame can be switched to a SONET network in its current format, with little or no modifications to the LDL frame. However, the payload may require scrambling prior to placement onto a SONET network.

The encapsulation of an Ethernet network PDU into LDL involves no manipulation of the original Ethernet network PDU with the exception that the preamble, start frame delimiter, pad and frame check sequence will not be transported. Because they will not be carried in the LDL payload, they will be reconstructed on the far-end after arriving via the transport.

FIG. 8 illustrates the encapsulation of Ethernet Network PDU in an LDL packet.

Figure 9:
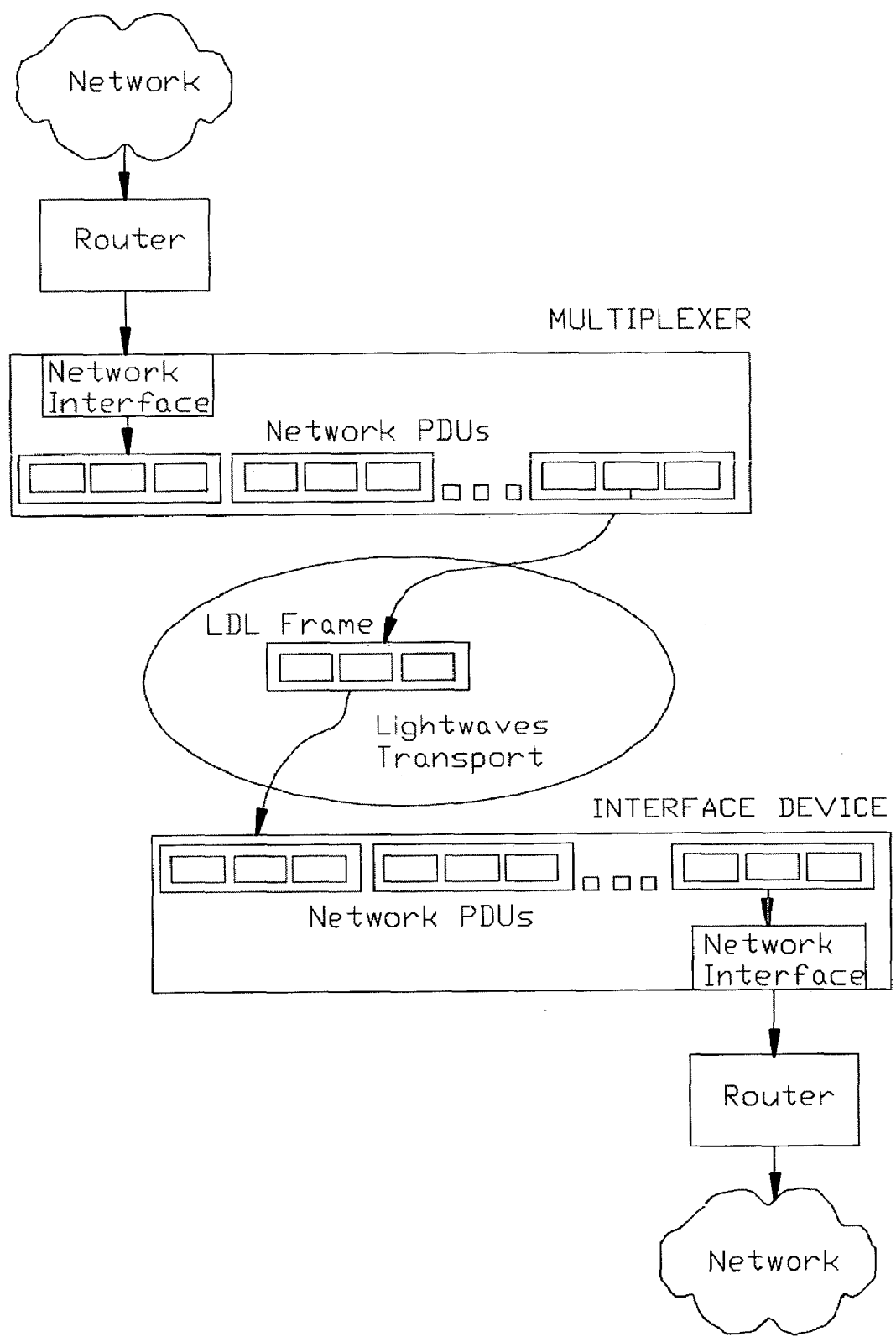
FIG. 9 is an illustration of LDL packets being transported over a network according to one embodiment of the present invention.

FIG. 9 illustrates a flow chart of LDL packets being transported over a network of the present invention.

An Ethernet network PDU switching table is required on the multiplexer in a telephone central office, or CATV head end, or a device acting as a director for the transport of an Ethernet network PDU to the correct device. When a device or service is provisioned a MAC or network protocol specific address will be assigned to a particular LDL stream ID. FIG. 9 illustrates the flow of a network PDU originating from a network interconnect on the CO side through the transport fabric to a Customer Premise Equipment (CPE) device.

The Ethernet network PDU Address to LDL Stream ID Table contains mapping information required to create a LDL frame. In addition, the network PDU is encapsulated into the LDL frame after which the LDL frame is subsequently routed to the appropriate device. In the case of Ethernet, the CO device will maintain a pool of MAC addresses to assign them to CPE devices in a manner to be detailed later.

Figure 10:
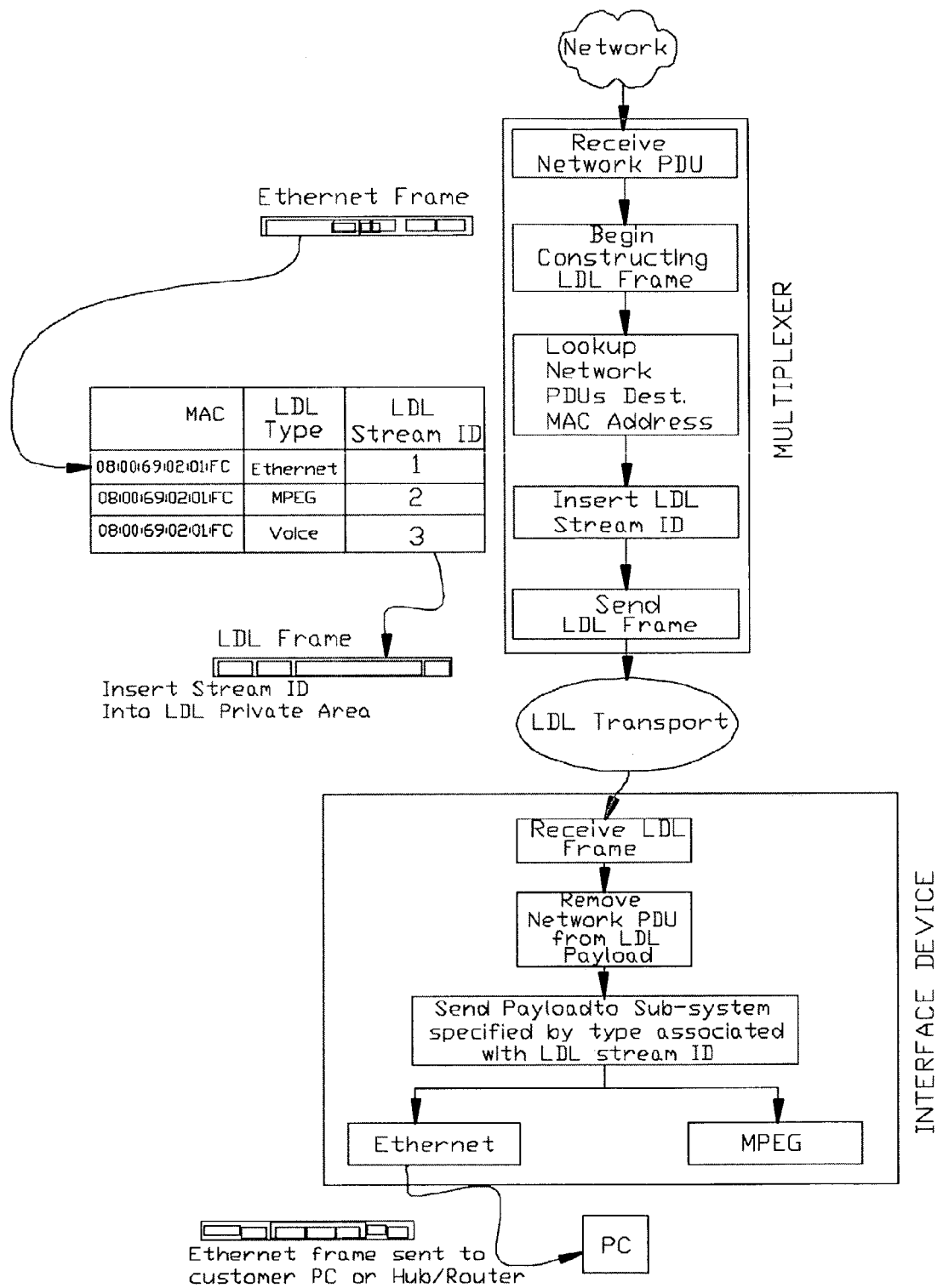
FIG. 10 is a flow chart illustrating Ethernet Network PDUs to device switching according to one embodiment of the present invention.

FIG. 10 is a flow chart illustrating Ethernet Network PDUs to device switching.

The encapsulation of an MPEG-2 Transport (TS) network PDU into LDL involves no manipulation of the original MPEG-2 PDU. The transport of the MPEG-2 PDU while not exactly identical as the Ethernet PDU, still involves the encapsulation of the MPEG-2 PDU into LDL and transport on the LDL transport similarly to FIG. 10 above.

FIG. 11 is an illustration of an MPEG-2 TS PDU encapsulated in an LDL packet.

Unlike the Ethernet transport requirements, the MPEG encapsulation into LDL will occur outside of the LDL transport core. The LDL transport core system will receive MPEG-2 TS packets already encapsulated into LDL. The primary purpose for this design is to:

Reduce scope of LDL transport core to transport focus activity

Figure 12:
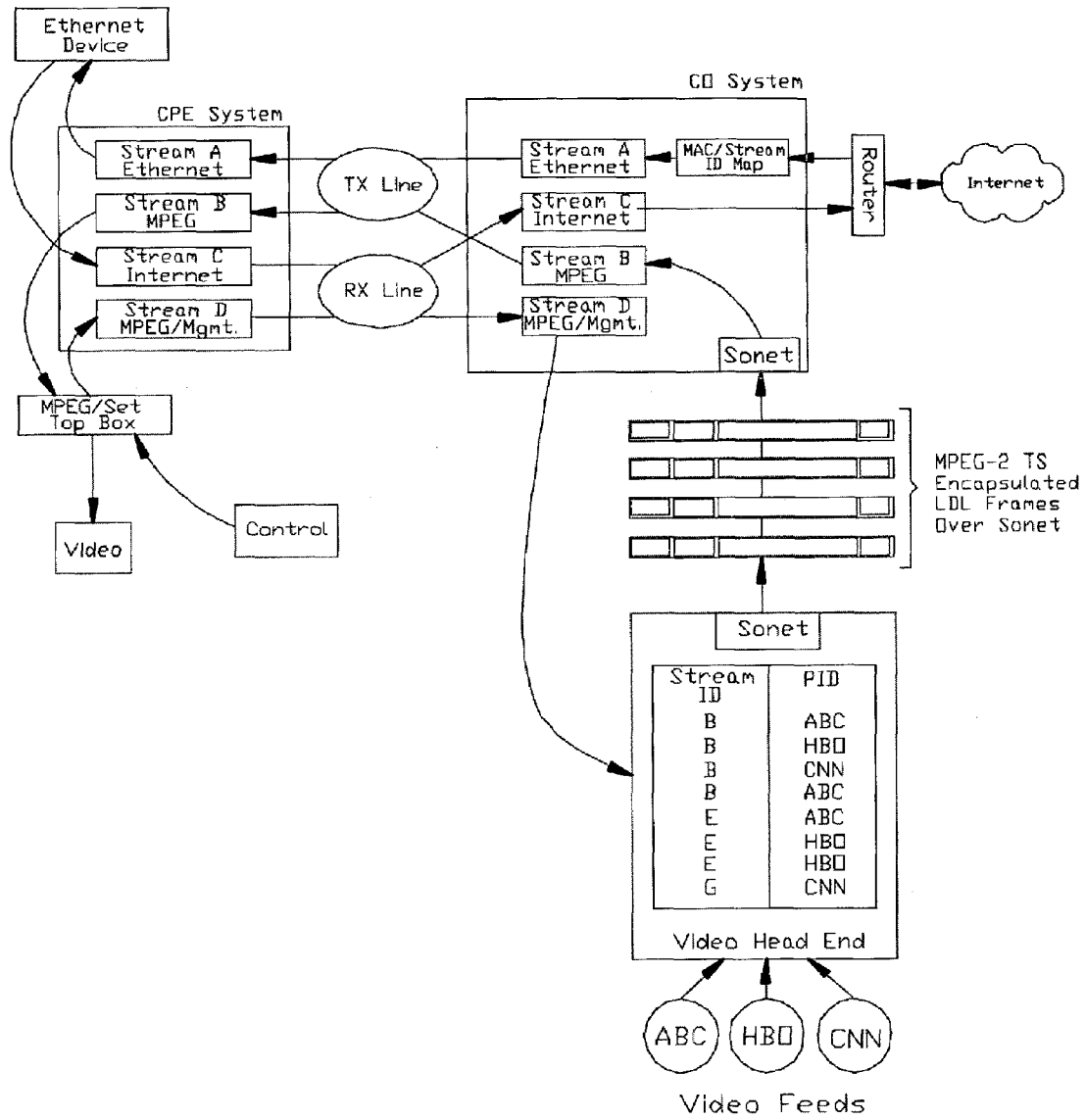
FIG. 12 is a flow chart illustrating of a system configured to deliver video feeds via streams to an end user according to one embodiment of the present invention.
Figure 13:
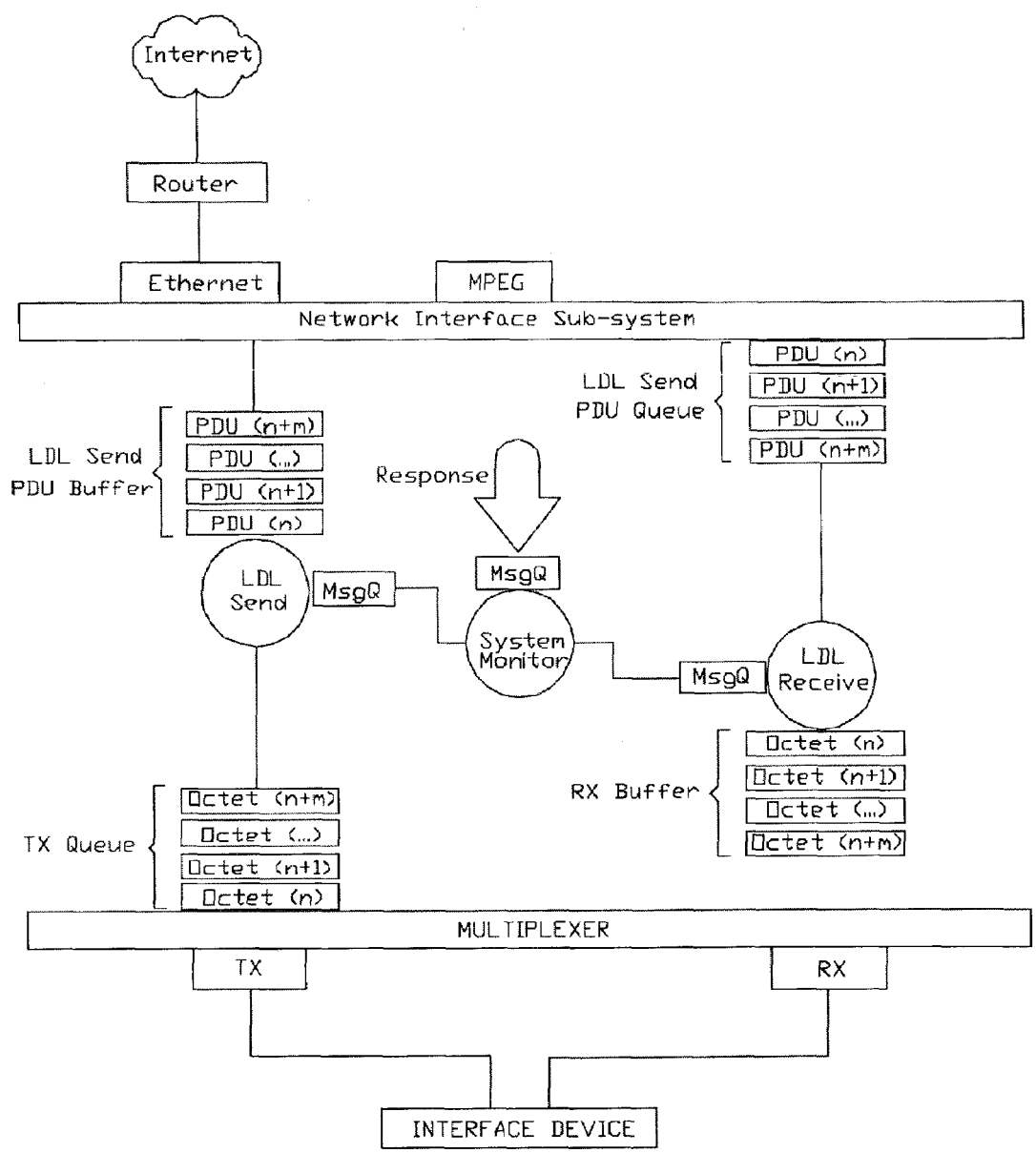
FIG. 13 is an illustration of a Central Office including high-level system requirements.

Move application and service control to application components to outside the LDL transport FIG. 12 is a flow chart illustrating of a system configured to deliver video feeds via streams to an end user. The first component is the system that contains the CO and CPE devices for transmitting LDL frames over the transport. The second is the Ethernet system that illustrates the transmission of Ethernet network PDUs between the CO network inter-connect and the client connected to the CPE device. The third component is the MPEG-based video broadcast application used to broadcast MPEG-2 transport (TS) frames from a video head to a set top box (STB) located off the CPE device.

It is important to note that the system is focused predominantly on transport while the application control logic for video feed selection and other value-added features such as on-demand video and audio is provided by application systems inter-connected to the framework via a high-speed interconnect such as SONET or Gigabit Ethernet. SONET will be able to accommodate LDL packets created within the video application easily since LDL is derived from SDL, which has been originally created for use within SONET networks.

The STB or other video application device will be enabled to send messages back to the video system via LDL which will then be forwarded back to the CO based video head-end and its management system. This interconnect can be done as SONET as well.

Each connection between the CPE and CO will have at least one video stream if video is incorporated into that particular configuration. If the transport is supplying video for more than one video device at the CPE location, then there are several different configurations possible:

All video MPEG frames are multiplexed onto one stream. This configuration is illustrated in FIG. 12. In this configuration, if four video feeds are required at the CPE side, then all four video feeds will be assigned to the one stream assigned for MPEG/video feeds and the single feed of multiplexed MPEG frames are extracted from the LDL frames and sent to the CPE video application, for example an STB. This configuration is preferable where one video application or STB is used for managing all video feeds.

All video MPEG frames are assigned their individual stream. In this configuration, if four video feeds are required at the CPE side, then all four video feeds are assigned their own stream. Once the CPE device receives the frame for a particular stream, it will extract the MPEG frame from LDL and send it to the CPE video application, for example a STB, that is inter-connected to the device assigned to that particular MPEG feed. This configuration is preferable where a video application or STB is required for each video feed or MPEG stream.

One skilled in the art having the benefit of this disclosure will realize that "data storage" refers to a comprehensive list of methods and systems for the storing of data and information. This can include methods such as the use of files, ASCII files, databases, relational databases, indexed-based databases, CD, magnetic storage, optical storage, distributed data and databases, replicated data and databases, RAM, ROM, reverberating data storage, cache, and local or remote storage systems.

In addition the data can be represented in many formats including but not limited to binary, ASCII, EBCDIC, foreign-language sets, MPEG, MPEG-2, MP3, text and XML. Data can be organized or not organized and can be stored in some form of database including ones such as but not limited to Oracle, Sybase, Microsoft SQL, MySQL, Velocis, Ingres, Postgres, Chaotic Databases, and proprietary non-public database methods and systems.

In addition, one skilled in the art will also note that "information exchange" refers to the transfer of information over a variety of possible transports between one or more entities. Transports for "information exchange" include, but are not limited to wireline or wireless networks including fiber, SONET, Ethernet, Gigabit Ethernet, CDMA, Ultra-Wide Band, MegaBand, internal and external bus, Infiniband, Advanced TCA, Periperal Component Interconnect (PCI), etc. The "information exchange " transport can include many different protocols including but not limited to IP-based protocols, TCP/IP, IP, Systems Network Architecture (SNA), FTP, HTTP, IPX/SPX, Netbui, Novell, etc.

"Information exchange" includes, but is not limited to data, text, records, files and other forms of electronically encoded data.

The entities within the definition of "information exchange" include elements that comprise the preferred embodiment, sub-systems or sub-elements of an element(s) within the preferred embodiment. In addition, an entity can include a third-party system or sub-system(s) of a third-party system.

"Information exchange" also includes methodologies and third-party products such as, but not limited to XML, SOAP, CORBA, Tibco, Middle-layer, grid computing, DCE, etc. Furthermore, "information exchange" includes the use of private-proprietary and public-standard formats and secure methods, including but not limited to encryption and secure socket layer (SSL).

"Information exchange" also includes a push methodology where information is pushed to one or more elements from one or more elements. Conversely, "information exchange" can include a methodology where information is pulled from one or more elements to one or more elements.

The management system described as follows is designed for use in the present invention's preferred embodiment on telephone twisted pair networks, particularly considering the impact of high bandwidth/user becoming available. The management system has been designed to be easily adaptable to other embodiments of the present invention including, but not limited to, CATV networks.

Figure 14:
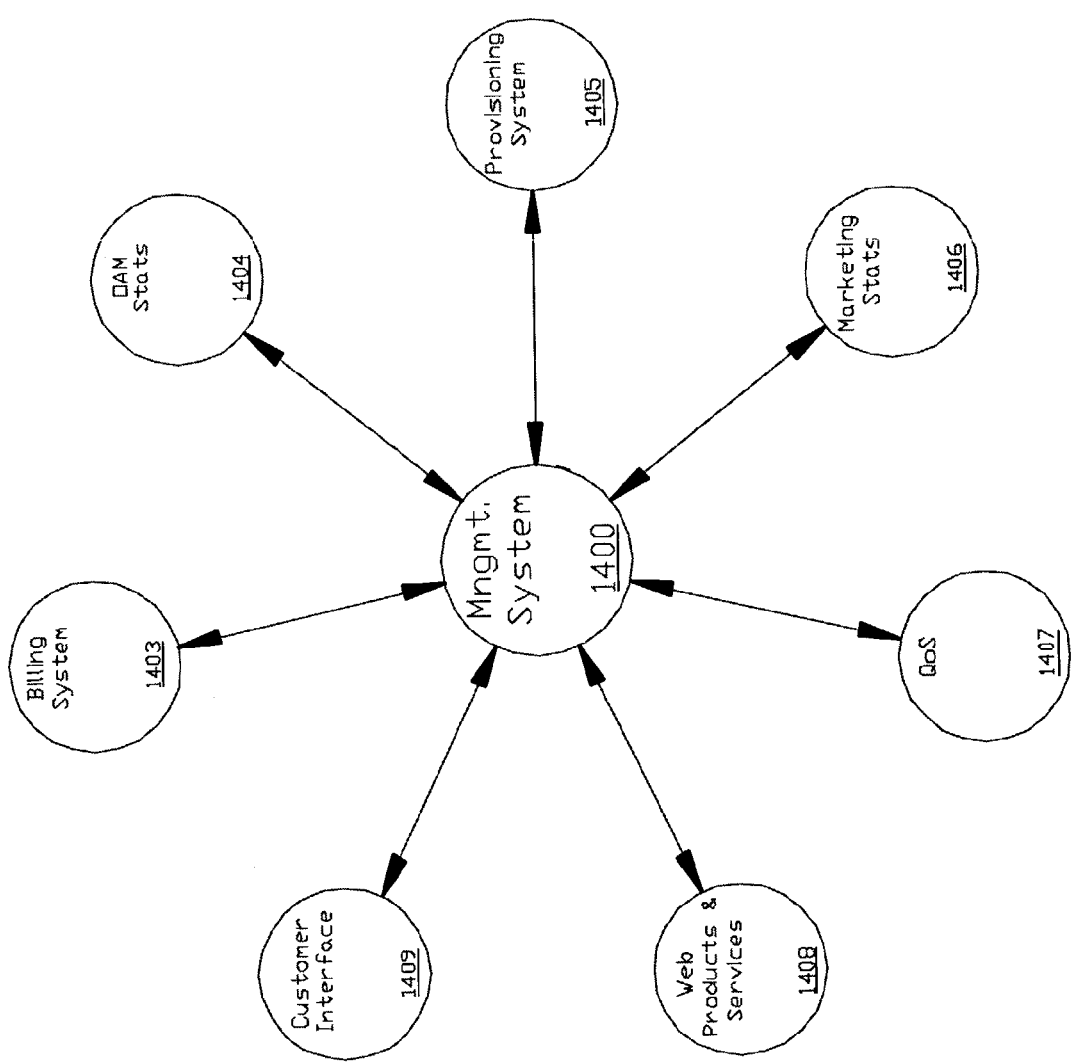
FIG. 14 is an illustration illustrating various components that may be configured in an LDL Management System.

The services management system 1400, as shown in FIG. 14, includes a plurality of service applications that can be a combination of one or more computer applications, software modules, computer programs including: billing and revenue applications 1403, operations and management applications 1404, service and customer provisioning applications 1405, marketing and sales support applications, quality of service (QoS) applications 1407.

One skilled in the art can realize that the service applications within the services management system 1400 can depend and integrate with other service applications. Examples of this would be the need for the marketing sales and support 1406 needing to access customer account information and procedures contained in the service and customer provisioning applications 1405 and billing and revenue applications 1403.

In addition, the service applications may require supportive elements that reside on other elements outside of the services management system 1400. These other elements can include other components of the preferred embodiment such as, but not limited to, the multiplexer 1700 as shown in FIG. 17 and line interface device codec 361 as shown in. FIG. 3 and FIG. 4

Other supportive elements for service applications within the services management system 130 can include third-party systems and databases that reside outside the preferred embodiment. Examples of these include, but are not limited to video and audio service providers, gaming providers, application service providers (ASP), e-mail services, unified messaging, emergency broadcast and notification, etc.

The hardware architecture of the services management system 130 can consist of a centralized, distributed or grid computing model and can include a combination of one or more processing devices s such as, but not limited to mainframes such as IBM 3090, IBM RS/6000, PC's, workstations such as H/P, Sun, Compaq.

Each processing device can dictate the operating system requirements and options. The operating options include, but are not limited to the many of the variants of Unix, e.g. Red Hat Linux and HP-UX, IBM mainframe operating systems, e.g. MVS/TSO, Microsoft Windows, embedded operating systems such as eCos, VxWorks, QNX and hardware.

In addition, the hardware architecture can consist of centralized or distributed media storage devices. These media devices can include standard magnetic storage systems such as disk, diskette and tape, optical storage systems, media storage arrays, cache and memory. These storage media devices can be local or remote to the processing devices and can be interconnected to one or more of the hardware devices over local bus such as SCSI, PCI, Infiniband, networked bus such as iSCSI, FiberChannel, communications protocols such as NFS and TCP/IP.

The data for the service management system 130 components can be stored in standard file formats, e.g. ASCII text, binary, compressed, etc., in memory or in a database such as but not limited to Oracle, Sybase, Microsoft Access, MySQL, DataSpace and a chaotic database.

In support of some of the service management system 1400 and associated service applications. Third-party application packages and engines can be implemented in full or part including, but not limited to Matrixsoft's eMatrix for expediting business processes, Amdocs for customer care and billing, PeopleSoft, Siebel and Athene software products for customer care and support systems, and on-line shopping technologies such as shopping carts, credit card processing and Internet web servers such as Apache.

Additional software developed for the service management system 1400 and associated service applications can be created in a plurality of software languages including C, C++, PHP, ASP Vbscript, Java, SQL, embedded SQL, OBDC, COBOL and can include the use of various application programming interfaces provided by third-party products such as Customer Interface 1409 into the service management system 1400 and service applications can occur via a plurality of methods including, but not limited to a web browser, a PDA, a telephone and a cell phone. In addition, user access or service management system 1400 requests originating from components in the preferred embodiment such as a set-top box, or Internet appliance, etc. can be received from the Multiplexer 1700 as shown in FIG. 3 and FIG. 4.

The billing and revenue support system 1403 provides support for the many facets of billing and revenue including, but not limited to billing, rates management, processing and rating of user usage records, the management of product and services packages (plans, promotions, discounts, volume), sales commissions, taxes, etc.

Operation and Maintenance (OAM) 1404—Elements of the preferred embodiment of the present invention will collect and maintain information related to providing insight to the performance and operational aspects of the preferred embodiment.

Examples of performance and operation indicators include, but are not limited to statistics for transactions, network transaction, memory usage, processor usage, user access information, database transaction, input/output transactions (bus, disk, network, card), disk transactions, cache transactions, network usage, network overflow, network re-routes, network blockage and service interruptions.

OAM information may be stored via means outlined above under "data storage" either on the devices where the OAM indicators are monitored and collected or they can be pushed to a "data storage" element within the preferred embodiment or on a third-party system.

Likewise, OAM information may be exchanged as outlined above under the definition of "information exchange" with other service management system 1400 applications such as quality of service application 1407. In addition, OAM can exchange information as outlined above under the definition of "information exchange" with third-party systems within a Network Operations Center (NOC) such as but not limited to an HP OpenView or other network monitoring and operational systems.

Service Provisioning Application 1405—Service provisioning applications 1405 are responsible for the provisioning of services to users of the preferred embodiment. When a user wishes to add, delete or change services such as Internet and video services the service management system's 1400 provisioning applications 1405 are largely responsible for the managing the change request among the many components that compose the preferred embodiment.

For example, if a user wishes to add Internet service, the service provisioning applications 1405 will issue a request to the Multiplexer 1700 to allocate resources and perform other operations that enable the transmission of Internet services between an end-user and the Internet. In addition, the service provisioning applications 1405 will send a request to end-user's interface device 361 as shown in FIGS. 3 and 4, instructing it to allocate resources and perform procedures that enable Internet services. There could be additional requests from the service provisioning application 1405 to any one or more preferred embodiment components for allocating resources and performing service enabling procedures.

In addition, the service provisioning application 1405 may respond to requests and issue requests to any of the other service management applications in the support of provisioning services.

In some cases, the provisioning of services for a user could require resource allocation and service enabling requests to third-party systems and services that access the preferred embodiment including, but not limited to video feeds, Internet services and telephony service.

For example, if a user wishes to subscribe to a particular music streaming service that is provided and access is controlled by a third-party service provider, then the service provisioning application 1405 would request the third-party service provider to begin sending a particular music stream to the service management system 1400, or the multiplexer 1700 on behalf of the user who requested the service.

Similarly, if a user decides to end the music stream subscription service, then the Service Provisioning application 1405 would send a request to the third-party service provider.

Any method of communicating instructions between the management system 1400 and the third-party service providers.

A request for the Service Provisioning System 1405 may originate from any of the interconnected components to the management system 1400.

Upon receipt of a service provisioning request, the Service Provisioning System 1405 may send additional requests to the other systems shown in FIG. 14.

Marketing and Sales Support 1406—Marketing and Sales Support 1406 application of the service management system 1400 is responsible for the collection and processing of information as it is related to marketing and sales analysis. For example, usage information regarding the services provided by the present invention can be analyzed individually or in aggregate to determine the popularity of services and other user metrics for tailoring the preferred embodiment's service offerings, user service packages, etc.

In addition, the Marketing and Sales Support 1406 component may include the use of third-party systems including but not limited to Athene's iCRM suite, APT Churn™ and APT Profitability™ software products to determine profitability of products and churn of customer services. These third-party systems may or may not be co-located with the service management system 1400 and may include the use of sharing or exchanging of data contained within the preferred embodiment.

Also, the Marketing and Sales Support 1406 system may include the use of web site statistics and logging utilities such as but not limited to WebTrends to analyze the use of web-enabled products and services of the preferred embodiment.

Quality of Service 1407—Quality of Service application 1407 is responsible for managing resources and other components within the preferred embodiment to provide quality of service to the users of the preferred embodiment. Depending on a variety of parameters, including but not limited to user service level agreements (SLAs), quality of service required for product and services provided or supplied by the preferred embodiment, the quality of service application 1407 is largely responsible for the managing the quality of service oriented requests among the many components that comprise the present invention.

If the Quality of Service application 1407 determines the need to adjust the level of resources and/or the performance on behalf of user(s) of the preferred embodiment, the quality of service application 1407 will issue such requests to the required elements, service applications and third-party systems.

In addition, if one or more operations among one or more of the preferred embodiment elements, service management system applications and/or third-party systems are required in support of quality of service, then the quality of service application 1407 will issue the required requests to the required elements, service applications and/third-party systems.

Web Enabled Products and Services 1408—As previously noted, there are several access methods into the preferred embodiment of the present invention. Among those listed are web-based services and products that are typically accessed by a browser-enabled device such as, but not limited to a computer or personal digital assistant (PDA.) These devices typically run some form of browser software such as but not limited to Microsoft's Internet Explorer or Netscape's browser.

By web-enabling the applications in whole or in part, a user of the preferred embodiment can access segments of the service management system's 1400 applications. Web enabling an application implies that the user can control components segments an application via the use of a browser.

Examples of web-enabled application segments within the preferred embodiment include, but are not limited to accessing and modifying user account and billing information, accessing customer care and help applications such as on-line chat, instant messaging and help web-pages, subscription services such as requesting an on-demand multimedia feed and the ordering services and products, etc.

FIG. 15 is a block diagram of a transmitter according to one embodiment of the present invention. FIG. 16 is a block diagram of a receiver according to one embodiment of the present invention. The transmitter and receiver of the present invention consists of the following functional items including but not limited to configuration, systems operations and management, pulse generation, pulse train generation, signal processing including filtering and correlation, pulse synchronization, software management and configuration, feature control, Ethernet configuration, development and real-time debugging capabilities, and network switching and routing capabilities.

The transmitter and receiver can be constructed of hardware and software components to create the above functionality including, but not limited to: field programmable gate arrays (FPGA), FPGA Intellectual Property cores, ASIC, processors, device drivers, digital signal processors (DSPs), Ethernet, FireWire, Open Peripheral Bus, DMA, real time operating systems (RTOS), debug ports, Microkernel, memory (RAM, ROM, Flash, disk), memory management, file management, digital to analog converters, analog to digital converters, phased-locked loops, clocks and other standard electrical components, boards and housing one skilled in the art would recognize as required to integrate components into a transmitter and receiver.

FIG. 17 is a block diagram of a multiplexer. Multiplexer 1700 is capable of combining two or more incoming data feeds A, B, and C onto a common transmission medium connected to I/O ports A, B, and C on line cards 1704, 1704', 1704'', and 1704'''. The multiplexer 1700 is capable of time division, code, and/or frequency division multiplexing.

Multiplexer 1700 is comprised of a control plane subsystem 1701, data plane subsystem 1702, trunk card 1703 (only one is shown for clarity), and line cards 1704, 1704', 1704'', 1704'''. Line Cards 1704, 1704', 1704'', 1704''' are comprised of transmitter 1500 and receiver 1600 as shown in FIGS. 15 and 16.

FIG. 18 illustrates the basic components of line interface device 361. The line interface device 361 is comprised of a transceiver, which is comprised of a transmitter 1500 and receiver 1600, ports for connecting to transmission mediums 1801, 1802, a port for connected to signal wire 1807, an optional processor 1810 and optional memory 1820. The line interface device's transceiver handles the transmission and receipt of data signals between a user's device, such as, but not limited to a PC, set-top box, etc. (not shown), and multiplexer 1700 as shown in FIG. 17, FIGS. 3, 4, and 5 via transmission medium 1801. Transmission medium 1801 is a metallic guided medium such as, but not limited to, telephone twisted pair, coaxial cable, CAT-5 cable, power line, etc, but excludes fiber optic and wireless mediums.

A user connects a device (not shown) such as, but not limited to a PC, set-top box, or home networking router, to a port on the line interface device 361 via transmission medium 1802 in order to transmit and receive data from a remote source. The ports for transmission medium 1802 may include, but are not limited to an RJ-11 jack for telephone twisted pair, an RJ-45 jack for an Ethernet connection, IEEE 1394 Fire Wire connection, USB, RS-232, a PCMCIA slot, fiber optic, etc. The PCMCIA slot can be used as a wireless integration point for systems such as, but not limited to, Bluetooth, 802.11a, 802.11b, ultra wideband, etc. Only one port for transmission medium 1802 is shown for clarity, but the line interface device may be configured with any combination of additional ports as required.

A general description of the present invention, a description of a laboratory prototype, as well as a preferred embodiment, and alternative embodiments and aspects of the present invention has been set forth above. Those skilled in the art to which the present invention pertains will recognize and be able to practice additional variations in the methods and systems described which fall within the teachings of this invention. Accordingly, all such modifications and additions are deemed to be within the scope of the invention, which is to be limited only by the claims, appended hereto.

What is claimed is:
1. A method of data transmission, comprising:
representing data using at least one pulse based on a Gaussian wave form;
sending the at least one pulse over an electrically conductive guided media;
receiving the at least one pulse over the electrically conductive guided media;
recovering the data from the at least one pulse after receiving the at least one pulse over the electrically conductive guided media;
wherein the at least one pulse being sent during wave based transmissions across the electrically conductive guided media;
wherein the at least one pulse is sent temporally independent of the wave based transmissions.

2. The method of claim 1 wherein the step of representing data includes representing data by modifying a time domain signature associated with each of the at least one pulse.

3. The method of claim 1 wherein the at least one pulse includes a plurality of pulses and variable spaces between the pulses are used to represent data.

4. The method of claim 1 wherein variable pulse characteristics of the at least one pulse are used to represent data.

5. The method of claim 1 wherein the guided media is selected from the set comprising a coaxial cable, a telephone twisted pair, a category 5 cable, a power line, and a metallic body.

6. The method of claim 1 further comprising concurrently sending a wave-based transmission over the guided media.

7. The method of claim 1 wherein the step of recovering the data from the at least one pulse includes recovering the data from the at least one pulse at least partially based on a time domain signature of the at least one pulse.

8. The method of claim 1 further comprising selecting characteristics of the Gaussian wave form at least partially based on the guided medium.

9. The method of claim 1 wherein the step of representing data includes applying an m-ary modulation scheme based on timing of the at least one pulse.

10. The method of claim 9 wherein m is an integer of at least 2.

11. A method of data transmission, comprising:
creating a plurality of pulses based on a Gaussian waveform, the pulses having a time domain signature and a wideband frequency domain signature;
sending the plurality of pulses over an electrically conducting guided media during wave-based transmissions over the guided media;
wherein the plurality of pulses are sent temporally independent of the wave based transmissions.

12. The method of claim 11 wherein the guided media is a cable line.

13. The method of claim 11 wherein the guided media is a telephone line.

14. The method of claim 11 further comprising receiving the plurality of pulses and extracting data associated with the plurality of pulses.

15. A method of data transmission, comprising:
representing data using at least one pulse of a duration between approximately 0.50025 ns to 2650 ns and the at least one pulse being based on a Gaussian wave form having properties at least partially determined by properties of the electrically conductive guided media;
sending the at least one pulse over an electrically conductive guided media;
receiving the at least one pulse over the electrically conductive guided media;
recovering the data from the at least one pulse received over the conductive guided media by applying correlation to determine locations associated with the at least one pulse;
wherein the at least one pulse is sent over the electrically conductive guided media while the electrically conductive guided media is concurrently transmitting wave based signals;
wherein the properties being at least partially determined from a noise threshold of the wave based signals.

16. The method of claim 15 wherein the electrically conductive guided media is selected from the set comprising a coaxial cable, a telephone twisted pair, a category 5 cable, a power line, and a metallic body.

17. The method of claim 15 wherein the properties of the electrically conductive guided media which determine characteristics of the at least one pulse include the length of the guided media.

18. A method of data transmission for telephony applications, comprising:
representing data using at least one pulse based on a Gaussian wave form, the at least one pulse having a pulse width selected at least partially based on radiation associated with a telephone twisted pair;
sending the at least one pulse over the telephone twisted pair;
recovering the data from the at least one pulse;
sending the at least one pulse over the telephone twisted pair concurrently with wave based transmissions propagating over the telephone twisted pair;
wherein the at least one pulse is sent temporally independent of the wave based transmissions.

19. The method of claim 18 wherein each of the at least one pulse has a center channel frequency of between about 300 KHz and about 150 MHz.

20. A method of data transmission over cable television lines, comprising:
representing data using at least one pulse based on a Gaussian wave form, the at least one pulse having a pulse width selected at least partially based on radiation associated with a cable television line;
sending the at least one pulse over the cable television line;
recovering the data from the at least one pulse;
sending wave-based transmissions over the cable television line concurrently with the sending of the at least one pulse over the cable television line;
wherein the at least one pulse is sent temporally independent of the wave based transmissions.

21. The method of claim 20 wherein each of the at least one pulse has a center channel frequency of between about 300 KHz and about 2 GHz.

22. A method of data transmission over a data bus, comprising:
representing data using at least one pulse based on a Gaussian wave form;
sending the at least one pulse over the data bus;
recovering the data from the at least one pulse;
sending separate signals over the data bus concurrently with the sending of the at least one pulse over the data bus;
wherein the at least one pulse is sent temporally independent of the separate signals.

23. The method of claim 22 wherein the data bus is associated with an automotive vehicle.

24. A system for data communication, comprising:
an electrically conductive guided medium;
a plurality of line interface devices operatively connected to the electrically conductive guided medium;
each of the plurality of line interface devices comprising a transmitter for transmitting data using at least one pulse based on a Gaussian wave form, the pulse having characteristics at least partially determined by properties of the electrically conductive guided medium and sending the at least one pulse over the electrically conductive guided medium, a receiver for receiving at least one pulse based on a Gaussian waveform from the electrically conductive guided medium, a processor operatively connected to the receiver and the transmitter for representing data as the at least one pulse and for recovering data based on the at least one received pulse, and a memory operatively connected to the processor;

wherein the pulse is sent on the guided medium while concurrently transmitting wave based signals;

wherein the characteristics of the pulse at least partially determined from a noise threshold of the wave based signals.

25. The method of claim 24 wherein the properties of the electrically conductive guided media which determine characteristics of the at least one pulse include a length of the guided media.

26. An apparatus for data communication, comprising:

a transmitter operatively connected to an electrically conductive guided media for transmitting data using at least one pulse based on a Gaussian wave form and properties of the electrically conductive guided media and sending the at least one pulse over the electrically conductive medium;

a receiver operatively connected to the electrically conductive guided media for receiving through the electrically conductive guided media at least one pulse based on a Gaussian waveform;

a processor operatively connected to the receiver and the transmitter for representing data as the at least one pulse and for recovering data based on the at least one received pulse; and a memory operatively connected to the processor;

wherein the at least one pulse is sent on the electrically conductive guided media concurrently with wave based signals;

wherein the characteristics of the at least one pulse determined at least partially from a noise threshold of the wave based signals.

27. The method of claim 26 wherein the properties of the electrically conductive guided media which determine characteristics of the at least one pulse include the length of the guided media.

28. A method of data transmission, comprising:

representing data using at least one pulse based on an ultra-wideband wave form, the pulse having characteristics at least partially based on properties of the guided medium and signals propogated over the guided medium;

sending the at least one pulse across a guided medium;

receiving the at least one pulse from the guided medium; and recovering the data from the at least one pulse sent across the guided medium;

wherein the at least one pulse being sent across the guided medium while the guided medium concurrently transmitted are wave based signals;

wherein the characteristics determined at least partially from a noise threshold of the wave based signals.

29. The method of claim 28 wherein the properties of the electrically conductive guided media which determine characteristics of the at least one pulse include a length of the guided media.

30. The method of claim 28 wherein the step of representing data includes selecting pulse characteristics for the at least one pulse at least partially based on properties associated with the guided medium.

31. The method of claim 30 wherein the guided medium is coaxial cable and the pulse characteristics include a duration of approximately 0.5 nanoseconds to 2650 nanoseconds.

32. The method of claim 30 wherein the pulse characteristics are at least partially based on center channel frequency property associated with the guided medium.

33. The method of claim 21 wherein the coaxial cable is simultaneously used for wave based transmissions and transmission of the at least one pulse.

34. The method of claim 28 wherein the guided medium is simultaneously used for wave based transmissions and transmission of the at least one pulse.

35. The method of claim 28 wherein the guided medium is a telecommunications line.

36. The method of claim 35 wherein the telecommunications line is a telephone twisted pair.

37. The method of claim 30 wherein the guided medium is a telephone twisted pair.

38. The method of claim 37 wherein the properties of the telephone twisted pair include radiation of pulse energy in the telephone twisted pair.

39. The method of claim 37 wherein the properties of the twisted pair include attenuation and capacitance.

40. The method of claim 30 wherein the pulse characteristics include pulse shape.

41. The method of claim 30 wherein the pulse characteristics include pulse duration.

42. The method of claim 30 wherein the pulse characteristics include pulse spacing.

43. The method of claim 30, wherein the ultra-wideband signals representative of data comprise a multiplicity of pulse position modulated signals.

44. The method of claim 30, wherein the ultra-wideband signals representative of data comprise a multiplicity of polarity modulated signals.

45. The method of claim 30, wherein the ultra wideband signals representative of data comprise a multiplicity of phase modulated signals.

46. The method of claim 30, wherein the ultra-wideband signals representative of data comprise a multiplicity of pulse amplitude modulated signals.

47. The method of claim 30, wherein the ultra-wideband signals representative of data comprise a multiplicity of signals modulated simultaneously combining at least two of the methods of the set comprising: pulse position, pulse amplitude, pulse polarity, pulse phase, and pulse frequency.

48. The method of claim 30, wherein the ultra-wideband signals representative of data are modulated at a fixed pulse rate frequency.

49. The method of claim 30, wherein the ultra-wideband signals representative of data are modulated at a variable pulse rate frequency.

50. The method of claim 30, wherein the ultra-wideband signals representative of data are modulated at a pseudo-random pulse rate frequency.

51. The method of claim 30, wherein the ultra-wideband signals representative of data are modulated on a carrier signal.

52. The method of claim 30, wherein the ultra-wideband signals representative of data co-exist with narrowband signals on the same guided medium.

53. The method of claim 30, wherein the ultra-wideband signals representative of data are spectrally shaped.

54. The method of claim 30, wherein the ultra-wideband signals representative of data are transmitted synchronously.

55. The method of claim 30, wherein the ultra-wideband signals representative of data are transmitted asynchronously.

56. The method of claim 30, wherein the ultra-wideband signal is used to transmit data selected from the group consisting of: telephony data, high-speed data, digital video data, digital television data, Internet communication data and audio data.

57. The method of claim 30, wherein the ultra-wideband signal is unicast.

58. The method of claim 30, wherein the ultra-wideband signal is multicast.

59. The method of claim 30, wherein the ultra-wideband signal is transmitted on one frequency channel on a single medium.

60. The method of claim 30, wherein the ultra-wideband signal is transmitted on at least two frequency channels on a single medium.

61. The method of claim 59 wherein the ultra-wideband signal is multiplexed using a type of multiplexing selected from the group consisting of synchronous time division multiplexing, asynchronous time division multiplexing, code division multiplexing, and frequency division multiplexing.

62. The method of claim 59 wherein the ultra-wideband channel is of the type selected from the group consisting of a simplex, channel half-duplex, channel and full-duplex channel.

63. The method of claim 60 wherein the ultra-wideband signal is multiplexed using a type of multiplexing selected from the group consisting of synchronous time division multiplexing, asynchronous time division multiplexing, code division multiplexing, and frequency division multiplexing.

64. The method of claim 60 wherein the ultra-wideband channel is of the type selected from the group consisting of a simplex channel, half-duplex channel, channel, and a full-duplex channel.

65. A method of transmitting and receiving data through a television network, the method comprising the steps of:
   providing a television network;
   sending a plurality of ultra-wideband signals representative of data concurrently with a television network signal;
   receiving the plurality of ultra-wideband signals representative of data and the television network signal;
   recovering the plurality of ultra-wideband signals representative of data and the network television signal;
   wherein each of the plurality of ultra-wideband signals having properties at least partially determined from a noise threshold of the television network signal.

66. The method of claim 65, wherein the television network is selected from the group consisting of a fiber network, a non-fiber hard-wired network, and a wireless network.

67. The method of claim 65, wherein the television network is selected from a combination of at least two of the group consisting of a fiber network, a non-fiber hard-wired network, and a wireless network.

68. The method of claim 65, wherein the ultra-wideband signal and the television network signal use separate portions of an electromagnetic radiation spectrum.

69. The method of claim 65, wherein the ultra-wideband signal and the television network signal use substantially common portions of an electromagnetic radiation spectrum.

70. The method of claim 65, wherein the television network signal is used to transmit data selected from the group consisting of: telephony data, high-speed data, digital video data, digital television data, Internet communication data and audio data.

71. A method of transmitting and receiving data through a television network, comprising:
   sending a plurality of ultra-wide band signals representative of data with a television network signal through the television network;
   recovering the plurality of ultra-wide band signals representative of data and the television network signal from the television network;
   wherein each of the plurality of ultra-wideband signals having properties at least partially determined from a noise threshold of the television network signal.

72. The method of claim 71 wherein the television network includes a hard-wired network.

73. The method of claim 71 wherein the television network includes a fiber network.

74. A method of data communication, comprising:
   representing data with an ultra-wideband signal;
   sending the signal over a broadcast network at least partially comprised of electrically conductive guided media which is concurrently transmitting a plurality of non-ultra wideband signals;
   recovering the data from the ultra-wideband signal;
   wherein the ultra-wideband signal having properties at least partially determined from a noise threshold of the plurality of non-ultra wideband signals.

75. The method of claim 74 wherein the noise threshold of the plurality of non-ultra wideband signals is within a portion of the broadcast network.

76. The method of claim 75 wherein the noise threshold is within a noise range associated with the broadcast network.

* * * * *